US 9,745,720 B2

(12) United States Patent
Naito

(10) Patent No.: US 9,745,720 B2
(45) Date of Patent: Aug. 29, 2017

(54) WHEEL LOADER

(71) Applicant: KOMATSU LTD., Tokyo (JP)

(72) Inventor: Makoto Naito, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/902,928

(22) PCT Filed: Jul. 16, 2014

(86) PCT No.: PCT/JP2014/068938
§ 371 (c)(1),
(2) Date: Jan. 5, 2016

(87) PCT Pub. No.: WO2015/019813
PCT Pub. Date: Feb. 12, 2015

(65) Prior Publication Data
US 2016/0138244 A1 May 19, 2016

(30) Foreign Application Priority Data
Aug. 8, 2013 (JP) ................. 2013-165005

(51) Int. Cl.
*B60K 6/40* (2007.10)
*E02F 9/20* (2006.01)
*B60K 6/365* (2007.10)
*B60K 6/405* (2007.10)
(Continued)

(52) U.S. Cl.
CPC ............. *E02F 9/202* (2013.01); *B60K 6/365* (2013.01); *B60K 6/387* (2013.01); *B60K 6/40* (2013.01);
(Continued)

(58) Field of Classification Search
CPC .......... B60K 6/365; B60K 6/40; B60K 6/405; B60K 2001/006; B60K 6/387;
(Continued)

(56) References Cited
U.S. PATENT DOCUMENTS 7,070,531 B2 * 7/2006 Ishizaki .................. F16H 47/04
475/75
2005/0230171 A1 * 10/2005 Hasegawa ............ B60K 17/105
180/242
(Continued)

FOREIGN PATENT DOCUMENTS
JP 2000-35002 A 2/2000
JP 2004-353780 A 12/2004
(Continued)

OTHER PUBLICATIONS
International Search Report for the corresponding international application No. PCT/JP2014/068938, dated Sep. 30, 2014.

Primary Examiner — Ramya Burgess
Assistant Examiner — Lillian Nguyen
(74) Attorney, Agent, or Firm — Global IP Counselors, LLP

(57) ABSTRACT
The motor cooling system circulates cooling oil for cooling a motor. A transmission is configured to change a rotation speed ratio of an output shaft with respect to an input shaft by changing a rotation speed of the motor. A transmission case has an output shaft case for housing the output shaft. The output shaft case is positioned forward of the motor and protrudes to a position below the motor. The motor cooling system has a cooling oil tank for storing the cooling oil and a cooling oil pipe which connects a cooling oil tank and the motor. The cooling oil tank is positioned behind the output shaft case and under the motor.

12 Claims, 14 Drawing Sheets

(51) Int. Cl.
*E02F 9/08* (2006.01)
*B60K 6/387* (2007.10)
*B60K 6/445* (2007.10)
*E02F 3/28* (2006.01)
*B60K 1/00* (2006.01)
*B60K 6/38* (2007.10)

(52) U.S. Cl.
CPC .............. *B60K 6/405* (2013.01); *B60K 6/445* (2013.01); *E02F 3/283* (2013.01); *E02F 9/0866* (2013.01); *E02F 9/0883* (2013.01); *B60K 2001/006* (2013.01); *B60K 2006/381* (2013.01); *B60Y 2200/415* (2013.01); *B60Y 2306/03* (2013.01); *B60Y 2306/05* (2013.01); *B60Y 2400/73* (2013.01); *Y02T 10/6239* (2013.01)

(58) Field of Classification Search
CPC .............. B60K 2006/381; B60K 6/445; Y02T 10/6239; B60Y 2306/05; B60Y 2306/03; B60Y 2400/73; B60Y 2200/415; E02F 9/0883; E02F 9/0866; E02F 3/283; E02F 9/202
See application file for complete search history.

(56) References Cited

U.S. PATENT DOCUMENTS

| | | | |
|---|---|---|---|
| 2006/0217225 A1* | 9/2006 | Hiraki | F16H 47/04 475/72 |
| 2006/0260303 A1* | 11/2006 | Ishii | A01D 69/03 60/487 |
| 2008/0210482 A1* | 9/2008 | Ishii | A01D 69/03 180/242 |
| 2009/0025997 A1* | 1/2009 | Ishii | A01D 69/03 180/242 |
| 2009/0105028 A1 | 4/2009 | Hiraki et al. | |
| 2011/0237379 A1 | 9/2011 | Hiraki et al. | |
| 2015/0239332 A1 | 8/2015 | Okuda et al. | |
| 2016/0153174 A1* | 6/2016 | Naito | B60K 6/40 475/5 |

FOREIGN PATENT DOCUMENTS

| | | |
|---|---|---|
| JP | 2006-329244 A | 7/2006 |
| JP | 2009-174469 A | 8/2009 |
| WO | 2006/126368 A1 | 11/2006 |
| WO | 2013/108397 A1 | 7/2013 |

* cited by examiner

| MODE | Lo | | Hi | |
|---|---|---|---|---|
| | L1 | L2 | H1 | H2 |
| MOTOR/GENERATOR MG1 | M | M | G | G |
| MOTOR/GENERATOR MG2 | G | G | M | M |
| MOTOR/GENERATOR MG3 | M | G | M | G |
| CLUTCH CL | O | O | X | X |
| CLUTCH CH | X | X | O | O |
| CLUTCH Cm1 | O | X | X | O |
| CLUTCH Cm2 | X | O | O | X |

WHEEL LOADER

CROSS-REFERENCE TO RELATED APPLICATIONS

This application is a U.S. National stage application of International Application No. PCT/JP2014/068938, filed on Jul. 16, 2014. This U.S. National stage application claims priority under 35 U.S.C. §119(a) to Japanese Patent Application No. 2013-165005, filed in Japan on Aug. 8, 2013, the entire contents of which are hereby incorporated herein by reference.

BACKGROUND

Field of the Invention

The present invention relates to a hybrid-type wheel loader.

Background Information

Recently, a hybrid-type wheel loader has been proposed that travels using driving power from an engine and driving power from a motor. A hydraulic-mechanical transmission (HMT) or an electric-mechanical transmission (EMT) are disclosed as transmissions for a hybrid-type wheel loader as in, for example, Japanese Patent Laid-open No. 2006-329244.

The HMT has a planetary gear mechanism, and at least two hydraulic motors connected to rotating elements of the planetary gear mechanism. The hydraulic motor functions as either a motor or a pump in response to the travel state of the wheel loader. The HMT is configured to enable stepless changing of the rotation speed of the output shaft by changing the rotation speed of the hydraulic motor.

An electric motor may be used in an EMT in place of the hydraulic motor in the HMT. The electric motor functions as either a motor or a generator in response to the travel state of the wheel loader. Similar to the HMT, the EMT is configured to enable stepless changing of the rotation speed of the output shaft by changing the rotation speed of the electric motor.

SUMMARY

The temperature of the motor in the transmission of the above-mentioned hybrid-type wheel loader increases and therefore cooling of the motor becomes necessary. However, there is a concern that the size of the vehicle body increases when a cooling system for the motor is added.

An object of the present invention is to enable cooling of the motor while suppressing an increase in the size of the vehicle body in the hybrid-type wheel loader.

A wheel loader according to a first aspect of the present invention is provided with an engine, a travel device, and a transmission. The travel device is driven by the engine. The transmission transmits driving power from the engine to the travel device. The transmission has an input shaft, an output shaft, a gear mechanism, a transmission case, a motor, and a motor cooling system. The gear mechanism includes a planetary gear mechanism and transmits the rotation of the input shaft to the output shaft. The transmission case houses the input shaft, the gear mechanism, and the output shaft. The motor is connected to a rotating element of the planetary gear mechanism and is attached to the transmission case. The motor cooling system circulates cooling oil for cooling the motor. The transmission is configured so that a rotation speed ratio of the output shaft with respect to the input shaft is changed by changing the rotation speed of the motor. The transmission case has an output shaft case for housing the output shaft. The output shaft case is positioned forward the motor and protrudes to a position below the motor. The motor cooling system has a cooling oil tank for storing the cooling oil and a cooling oil pipe which connects the cooling oil tank and the motor. The cooling oil tank is positioned behind the output shaft case and under the motor.

The cooling oil tank in the wheel loader according to the present embodiment is positioned behind the output shaft case and under the motor. That is, by arranging the cooling oil tank by using a space behind the output shaft case and under the motor, the transmission case and the cooling oil tank can be arranged in a compact manner.

Moreover, by positioning the cooling oil tank under the motor, the cooling oil can be recovered from the motor to the cooling oil tank due to gravity. As a result, the cooling oil can be circulated efficiently.

The travel device preferably further has an axle shaft that extends in the vehicle width direction and an axle housing for housing the axle shaft. The axle housing is positioned further to the rear of the motor. The cooling oil tank is positioned in front of the axle housing.

In this case, by arranging the cooling oil tank by using a space positioned behind the output shaft case, under the motor, and in front of the axle housing, the transmission case, the cooling oil tank, and the axle housing can be arranged in a compact manner.

The bottom surface of the cooling oil tank preferably has a first sloped surface that slopes to the rear and upward. In this case, air flowing under the wheel loader can be guided toward the axle housing due to the bottom surface of the cooling oil tank. As a result, the axle housing can be cooled.

A virtual extension line of the sloped surface as seen in a side view of the vehicle preferably overlaps the axle housing. In this case, the axle housing can be cooled more effectively.

A vehicle body frame for supporting the transmission is preferably provided. The travel device further has a transmission shaft that transmits driving power from the transmission to the axle shaft. The cooling oil tank is arranged between the side surface of the vehicle body frame and the transmission shaft in the vehicle width direction. In this case, the cooling oil tank can be accessed easily from the side of the wheel loader. As a result, maintenance performance of the cooling oil tank can be improved.

The front surface of the cooling oil tank preferably has a second sloped surface that slopes to the front and downward. The cooling oil pipe is connected to the second sloped surface. In this case, the cooling oil pipe can be connected easily to the second sloped surface.

The motor and the cooling oil tank are preferably arranged on the same side with regard to the center axis of the transmission that extends in the vehicle front-back direction. In this case, the cooling oil pipe can be installed easily.

The wheel loader is preferably further provided with a transmission lubrication system. The transmission lubrication system circulates lubricating oil for lubricating the transmission. The motor cooling system is separate from the transmission lubrication system.

A conventional transmission without a motor is provided with a lubrication system for circulating lubricating oil for lubricating mechanisms, such as gears inside the transmission. The lubricating oil is circulated through the inside of the transmission whereby lubrication and cooling of the mechanisms inside the transmission are carried out.

When the motor is cooled using the transmission lubrication system as in the conventional transmission, there is a concern that the performance of the transmission or of the motor could deteriorate. For example, lubricating oil that has passed through the transmission includes metallic powder produced in the transmission. As a result, there is a possibility that the rotation of the parts inside the motor could be hindered due to the metallic powder if the motor is cooled using the transmission lubrication system.

Moreover, the temperature conditions of the oil suited to the transmission are different from the temperature conditions of the oil suited to the motor. However, it is difficult to control the temperature of the lubricating oil for the transmission and the temperature of the cooling oil for the motor to a temperature suited for each when the motor is cooled using the transmission lubrication system as in the conventional transmission.

Accordingly, the motor cooling system in the wheel loader according to the present exemplary embodiment is separate from the transmission lubrication system and therefore the motor can be cooled while suppressing a deterioration in the performance of the transmission or the motor in comparison to when the motor cooling system is the same system as the transmission lubrication system.

By arranging the cooling oil tank by using the space behind the output shaft case and under the motor, the transmission case and the cooling oil tank can be arranged in a compact manner in the wheel loader according to the first aspect of the present invention. Moreover, by arranging the cooling oil tank under the motor, the cooling oil can be recovered from the motor to the cooling oil tank due to gravity. As a result, the cooling oil can be circulated efficiently.

DESCRIPTION OF EXEMPLARY EMBODIMENTS

Figure 1:
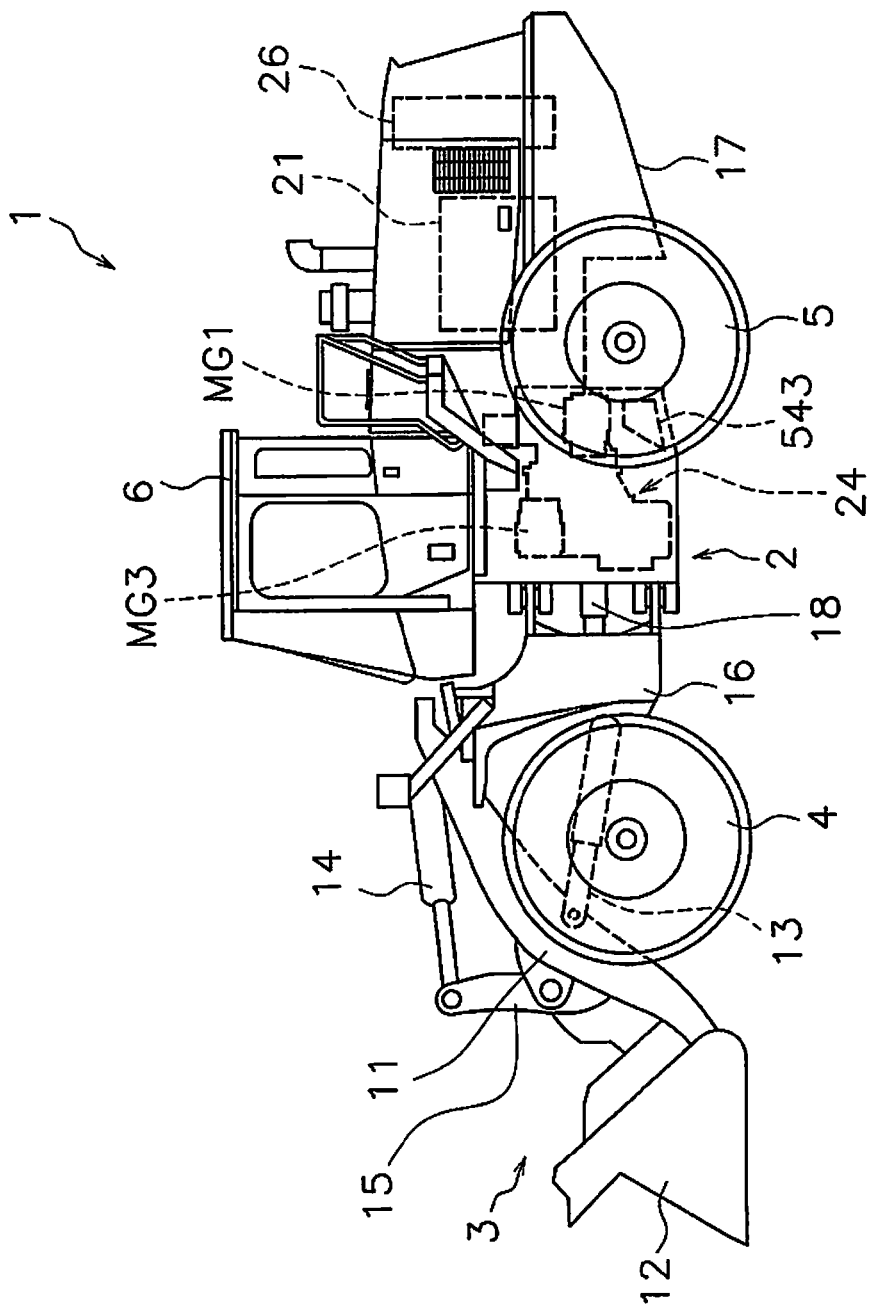
FIG. 1 is a side view of a wheel loader according to an exemplary embodiment of the present invention.

Exemplary embodiments of the present invention will be explained in detail with reference to the figures. FIG. 1 is a side view of a wheel loader 1 according to an exemplary embodiment of the present invention. The wheel loader 1 includes a vehicle body frame 2, a work implement 3, traveling wheels 4 and 5, and an operating cabin 6 as illustrated in FIG. 1. The wheel loader 1 travels due to the traveling wheels 4 and 5 being driven in a rotating manner. The wheel loader 1 is able to carry out work, such as excavation, by using the work implement 3.

The work implement 3 and the traveling wheels 4 are attached to the vehicle body frame 2. The work implement 3 is driven by hydraulic fluid from a work implement pump 23 (see FIG. 2). The work implement 3 has a boom 11 and a bucket 12. The boom 11 is mounted on the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the vehicle body frame 2. The other end of the lift cylinder 13 is attached to the boom 11. The boom 11 swings up and down due to the extension and contraction of the lift cylinder 13 due to hydraulic fluid from the work implement pump 23. The bucket 12 is attached to the tip of the boom 11. One end of the bucket cylinder 14 is attached to the vehicle body frame 2. The other end of the bucket cylinder 14 is attached to the bucket 12 via a bell crank 15. The bucket 12 swings up and down due to the extension and contraction of the bucket cylinder 14 due to hydraulic fluid from the work implement pump 23.

The operating cabin 6 and the traveling wheels 5 are attached to the vehicle body frame 2. The operating cabin 6 is mounted on the vehicle body frame 2. A seat for the operator and a below-mentioned operating device are disposed in the operating cabin 6. The vehicle body frame 2 has a front frame 16 and a rear frame 17. The front frame 16 and the rear frame 17 are attached to each other in a manner that allows swinging in the left-right direction.

The work implement 3 is attached to the front frame 16. The operating cabin 6 is mounted on the rear frame 17. Devices, such as a below-mentioned engine 21, a transmission 24, and a cooling device 26, are also mounted on the rear frame 17. The transmission 24 is positioned in front of the engine 21. The cooling device 26 is positioned behind the engine 21. The cooling device 26 has a radiator for cooling liquid coolant for the engine 21.

The wheel loader 1 has a steering cylinder 18. The steering cylinder 18 is attached to the front frame 16 and the rear frame 17. The steering cylinder 18 is a hydraulic cylinder. The wheel loader 1 is able to change the advancing direction to the right and left with the extension and contraction of the steering cylinder 18 due to hydraulic fluid from a below-mentioned steering pump 30.

Figure 2:
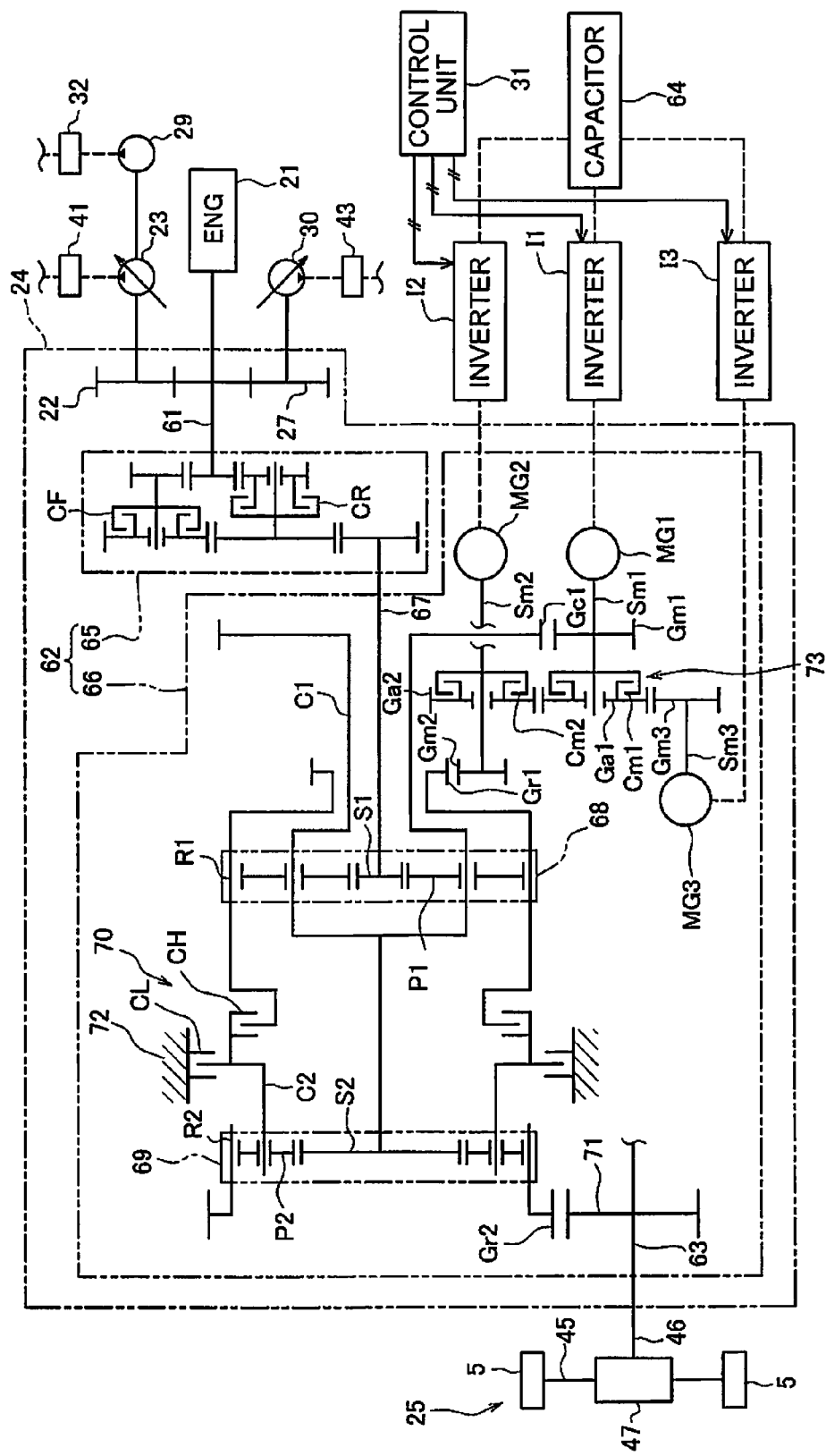
FIG. 2 is a schematic view of a configuration of the wheel loader.

FIG. 2 is a schematic view of a configuration of the wheel loader 1. As illustrated in FIG. 2, the wheel loader 1 is provided with the engine 21, the work implement pump 23, a transmission pump 29, the steering pump 30, the transmission 24, and a travel device 25.

The engine 21 is, for example, a diesel engine. The engine 21 generates driving power for driving the travel device 25, the work implement pump 23, the transmission pump 29, the steering pump 30, and the like.

The work implement pump 23, the transmission pump 29, and the steering pump 30 are hydraulic pumps. The work implement pump 23, the transmission pump 29, and the steering pump 30 are driven by driving power from the engine 21.

The work implement pump 23 is a variable displacement hydraulic pump. Hydraulic fluid discharged from the work implement pump 23 is supplied to the lift cylinder 13 and the bucket cylinder 14 through a work implement control valve 41.

The transmission pump 29 is a fixed displacement hydraulic pump. Hydraulic fluid discharged from the transmission pump 29 is supplied to various below-mentioned clutches of the transmission 24 via a clutch control valve 32.

The steering pump 30 is a variable displacement hydraulic pump. Hydraulic fluid discharged from the steering pump 30 is supplied to the above-mentioned steering cylinder 18 through a steering control valve 43.

The transmission 24 transmits driving power from the engine 21 to the travel device 25. The transmission 24 changes the speed and outputs the driving power from the engine 21. A configuration of the transmission 24 is discussed in detail below.

The travel device 25 is driven by the engine 21. The travel device 25 has a transmission shaft 46, an axle shaft 45, and the above-mentioned traveling wheels 5. The transmission shaft 46 transmits driving power from the transmission 24 to the axle shaft 45. The axle shaft 45 extends in the vehicle width direction and is connected to the traveling wheels 5. The axle shaft 45 transmits driving power from the transmission 24 to the traveling wheels 5. As a result, the traveling wheels 5 rotate.

A configuration of the transmission 24 is discussed in detail next. The transmission 24 is provided with an input shaft 61, a first power take-off mechanism 22 (referred to below as "first PTO 22"), a second power take-off mechanism 27 (referred to below as "second PTO 27"), a gear mechanism 62, an output shaft 63, a first motor MG1, a second motor MG2, and a third motor MG3.

The rotation from the engine 21 is inputted to the input shaft 61. The gear mechanism 62 transmits the rotation of the input shaft 61 to the output shaft 63. The output shaft 63 is connected to the above-mentioned travel device 25, and transmits the rotation from the gear mechanism 62 to the travel device 25.

The first PTO 22 is connected to the input shaft 61 and transmits a portion of the driving power from the engine 21 to the work implement pump 23 and the transmission pump 29. The second PTO 27 is connected to the input shaft 61 parallel to the first PTO 22 and transmits a portion of the driving power from the engine 21 to the steering pump 30.

The gear mechanism 62 is a mechanism for transmitting driving power from the engine 21. The gear mechanism 62 is configured so that the rotation speed ratio of the output shaft 63 with respect to the input shaft 61 is changed in response to changes in the rotation speeds of the motors MG1, MG2, and MG3. The gear mechanism 62 has a FR switch mechanism 65 and a speed change mechanism 66.

The FR switch mechanism 65 has a forward movement clutch CF, a reverse movement clutch CR, and various types of gears. The forward movement clutch CF and the reverse movement clutch CR are hydraulic clutches. The direction of the rotation outputted from the FR switch mechanism 65 is switched due to the switching between connected and disconnected states of the forward movement clutch CF and connected and disconnected states of the reverse movement clutch CR.

The speed change mechanism 66 has a middle shaft 67, a first planetary gear mechanism 68, a second planetary gear mechanism 69, a Hi/Lo switch mechanism 70, and an output gear 71. The middle shaft 67 is coupled to the FR switch mechanism 65. The first planetary gear mechanism 68 and the second planetary gear mechanism 69 are disposed on the same axis as the middle shaft 67.

The first planetary gear mechanism 68 has a first sun gear S1, a plurality of first planet gears P1, a first carrier C1 that supports the plurality of first planet gears P1, and a first ring gear R1. The first sun gear S1 is coupled to the middle shaft 67. The plurality of first planet gears P1 mesh with the first sun gear S1 and are supported in a rotatable manner by the first carrier C1. A first carrier gear Gc1 is provided on an outer peripheral part of the first carrier C1. The first ring gear R1 meshes with the plurality of first planet gears P1 and is able to rotate. A first ring outer periphery gear Gr1 is provided on the outer periphery of the first ring gear R1.

The second planetary gear mechanism 69 has a second sun gear S2, a plurality of second planet gears P2, a second carrier C2 that supports the plurality of second planet gears P2, and a second ring gear R2. The second sun gear S2 is coupled to the first carrier C1. The plurality of second planet gears P2 mesh with the second sun gear S2 and are supported in a rotatable manner by the second carrier C2. The second ring gear R2 meshes with the plurality of second planet gears P2 and is able to rotate. A second ring outer periphery gear Gr2 is provided on the outer periphery of the second ring gear R2. The second ring outer periphery gear Gr2 meshes with the output gear 71, and the rotation of the second ring gear R2 is outputted to the output shaft 63 via the output gear 71.

The Hi/Lo switch mechanism 70 is a mechanism for switching the driving power transmission path of the transmission 24 between a high-speed mode (Hi mode) in which the vehicle speed is high and a low-speed mode (Lo mode) in which the vehicle speed is low. The Hi/Lo switch mechanism 70 has a Hi-clutch CH that is ON during the Hi mode and a Lo-clutch CL that is ON during the Lo mode. The Hi-clutch CH connects or disconnects the first ring gear R1 and the second carrier C2. The Lo-clutch CL connects or disconnects the second carrier C2 and a fixed end 72 to prohibit or allow the rotation of the second carrier C2.

The clutches CH and CL are hydraulic clutches, and hydraulic fluid from the transmission pump 29 is supplied to each of the clutches CH and CL. The hydraulic fluid for the clutches CH and CL is controlled by the clutch control valve 32.

The first motor MG1, the second motor MG2, and the third motor MG3 function as drive motors that generate driving power using electrical energy. The first motor MG1, the second motor MG2, and the third motor MG3 also function as generators that use inputted driving power to generate electrical energy.

The first motor gear Gm1 is fixed to a rotating shaft Sm1 of the first motor MG1. The first motor gear Gm1 meshes with the first carrier gear Gc1. A second motor gear Gm2 is fixed to a rotating shaft Sm2 of the second motor MG2. The second motor gear Gm2 meshes with the first ring outer periphery gear Gr1.

The third motor MG3 assists the first motor MG1 and the second motor MG2. The speed change mechanism 66 has a motor switching mechanism 73, and the motor switching mechanism 73 selectively switches the target of the assistance from the third motor MG3 to the first motor MG1 or the second motor MG2.

Specifically, the motor switching mechanism 73 has a first motor clutch Cm1, a second motor clutch Cm2, a first connecting gear Ga1, and a second connecting gear Ga2. A third motor gear Gm3 is connected to a rotating shaft Sm3 of the third motor MG3, and the third motor gear Gm3 meshes with the first connecting gear Ga1. The first motor clutch Cm1 switches between connecting and disconnecting the first connecting gear Ga1 and the rotating shaft Sm1 of the first motor MG1. The first connecting gear Ga1 meshes with the second connecting gear Ga2. The second motor clutch Cm2 switches between connecting and disconnecting the second connecting gear Ga2 and the rotating shaft Sm2 of the second motor MG2.

The first motor clutch Cm1 and the second motor clutch Cm2 are hydraulic clutches. Hydraulic fluid from the transmission pump 29 is supplied to each of the motor clutches Cm1 and Cm2. The hydraulic fluid for the motor clutches Cm1 and Cm2 is controlled by the clutch control valve 32.

While the first motor clutch Cm1 is connected and the second motor clutch Cm2 is disconnected, the third motor gear Gm3 assists the first motor MG1. While the second motor clutch Cm2 is connected and the first motor clutch Cm1 is disconnected, the third motor gear Gm3 assists the second motor MG2.

The first motor MG1 is connected to a capacitor 64 via a first inverter I1. The second motor MG2 is connected to the capacitor 64 via a second inverter I2. The third motor MG3 is connected to the capacitor 64 via a third inverter I3.

The capacitor 64 functions as an energy reservoir unit for storing energy generated by the motors MG1, MG2, and MG3. That is, the capacitor 64 stores electrical power generated by the motors MG1, MG2, and MG3 when the total electrical power generation amount of the motors MG1, MG2, and MG3 is high. The capacitor 64 releases electrical power when the total electrical power consumption amount of the motors MG1, MG2, and MG3 is high. That is, the motors MG1, MG2 and MG3 are driven by electrical power stored in the capacitor 64. A battery may be used as another electrical power storage means in place of the capacitor.

The wheel loader 1 is provided with a control unit 31. The control unit 31 applies command signals for indicating the command torques for the motors MG1, MG2, and MG3 to the inverters I1, I2, and I3. The control unit 31 applies command signals for controlling the clutch hydraulic pressure of the clutches CF, CR, CH, CL, Cm1, and Cm2 to the clutch control valve 32. The clutch control valve 32 includes a plurality of valves for controlling the clutches CF, CR, CH, CL, Cm1, and Cm2.

The motors MG1, MG2, and MG3 and the clutches CF, CR, CH, CL, Cm1, and Cm2 are controlled with command signals from the control unit 31, whereby the speed change ratio and the output torque of the transmission 24 are controlled. The operations of the transmission 24 are discussed below.

Figures 3, 4:
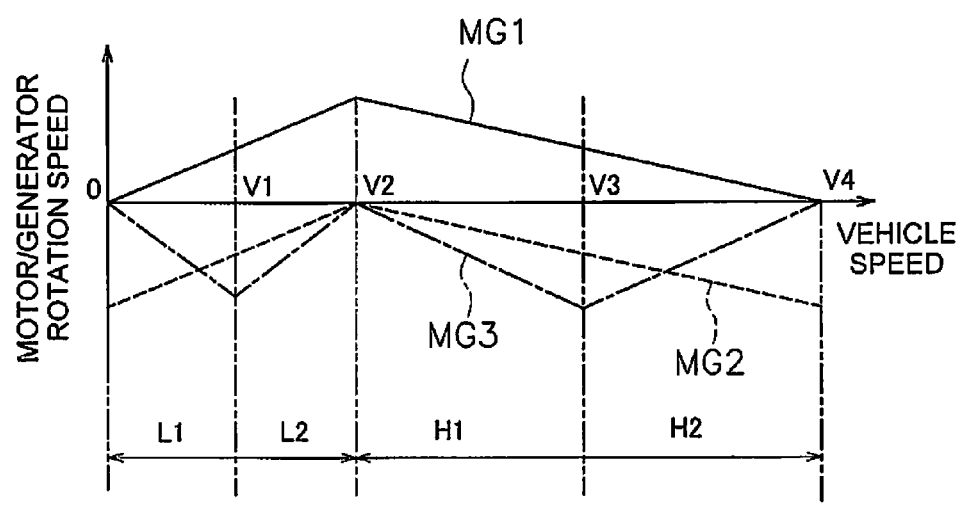
FIG. 3 is a table illustrating functions of first to third motors and states of clutches.
FIG. 4 illustrates changes in rotation speeds of the first to third motors with respect to the vehicle speed.

An outline of operations of the transmission 24 when the vehicle speed increases from zero in the forward movement side while the rotation speed of the engine 21 remains fixed, will be explained with reference to FIGS. 3 and 4. FIG. 3 illustrates functions of the motors MG1, MG2, and MG3 and states of the clutches in the modes. The Lo mode has an L1 mode and an L2 mode. The Hi mode has an H1 mode and an H2 mode. In FIG. 3, "M" signifies the fact that the motors MG1, MG2, and MG3 are functioning as driving motors. "G" signifies the fact that the motors MG1, MG2, and MG3 are functioning as generators. "O" signifies the fact that the clutch is in the connected state. "X" signifies the fact that the clutch is in the disconnected state.

FIG. 4 illustrates rotation speeds of the motors MG1, MG2, and MG3 with respect to the vehicle speed. When the rotation speed of the engine 21 is fixed, the vehicle speed changes in response to the rotation speed ratio of the transmission 24. The rotation speed ratio is the ratio of the rotation speed of the output shaft 63 with respect to the rotation speed of the input shaft 61. Therefore, the variation in the vehicle speed in FIG. 4 matches the variation of the rotation speed ratio of the transmission 24. That is, FIG. 4 illustrates the relationships between the rotation speeds of the motors MG1, MG2, and MG3 and the rotation speed ratio of the transmission 24. The solid line in FIG. 4 represents the rotation speed of the first motor MG1, the dashed line represents the rotation speed of the second motor MG2, and the long dashed short dashed line represents the rotation speed of the third motor MG3.

In the region in which the vehicle speed is zero or greater to less than V1, the Lo-clutch CL is connected, the Hi-clutch CH is disconnected, the first motor clutch Cm1 is connected, and the second motor clutch Cm2 is disconnected (L1 mode). Because the Hi-clutch CH is disconnected, the second carrier C2 and the first ring gear R1 are disconnected. Because the Lo-clutch CL is connected, the second carrier C2 is fixed. Moreover, the first connecting gear Ga1 is connected to the rotating shaft Sm1 of the first motor MG1 and the second connecting gear Ga2 is disconnected from the rotating shaft Sm2 of the second motor MG2. As a result, the third motor MG3 is connected to the first motor MG1 via the third motor gear Gm3, the first connecting gear Ga1, and the first motor clutch Cm1. The third motor MG3 is disconnected from the second motor MG2 because the second motor clutch Cm2 is disconnected.

The driving power from the engine 21 in the L1 mode is inputted to the first sun gear S1 via the middle shaft 67, and the driving power is outputted from the first carrier C1 to the second sun gear S2. Conversely, the driving power inputted to the first sun gear S1 is transmitted from the first planet gears P1 to the first ring gear R1 and outputted through the first ring outer periphery gear Gr1 and the second motor gear Gm2 to the second motor MG2. The second motor MG2 functions mainly as a generator in the L1 mode, and a portion of the electrical power generated by the second motor MG2 is stored in the capacitor 64.

The first motor MG1 and the third motor MG3 function mainly as electric motors in the L1 mode. The driving power of the first motor MG1 and the third motor MG3 is outputted to the second sun gear S2 along a path from the first motor gear Gm1 to the first carrier gear Gc1 to the first carrier C1. The driving power outputted to the second sun gear S2 as described above is transmitted to the output shaft 63 along a path from the second planet gears P2 to the second ring gear R2 to the second ring outer periphery gear Gr2 to the output gear 71.

In the region in which the vehicle speed is V1 or greater to less than V2, the Lo-clutch CL is connected, the Hi-clutch CH is disconnected, the first motor clutch Cm1 is disconnected, and the second motor clutch Cm2 is connected (L2 mode). Therefore, the second connecting gear Ga2 is connected to the rotating shaft Sm2 of the second motor MG2 and the first connecting gear Ga1 is disconnected from the rotating shaft Sm1 of the first motor MG1. As a result, the third motor MG3 is connected to the second motor MG2 via the third motor gear Gm3, the first connecting gear Ga1, the second connecting gear Ga2, and the second motor clutch Cm2. The third motor MG3 is disconnected from the first motor MG1 because the first motor clutch Cm1 is disconnected.

The driving power from the engine 21 in the L2 mode is inputted to the first sun gear S1 via the middle shaft 67, and the driving power is outputted from the first carrier C1 to the second sun gear S2. Conversely, the driving power inputted to the first sun gear S1 is transmitted from the first planet gears P1 to the first ring gear R1 and outputted through the first ring outer periphery gear Gr1 and the second motor gear Gm2 to the second motor MG2. Moreover, the driving power is outputted from the second motor gear Gm2 to the third motor MG3 via the second motor clutch Cm2, the second connecting gear Ga2, the first connecting gear Ga1, and the third motor gear Gm3. The second motor MG2 and the third motor MG3 function mainly as generators in the L2 mode, and a portion of the electrical power generated by the second motor MG2 and the third motor MG3 is stored in the capacitor 64.

The first motor MG1 functions mainly as an electric motor in the L2 mode. The driving power of the first motor MG1 is outputted to the second sun gear S2 along a path from the first motor gear Gm1 to the first carrier gear Gc1 to the first carrier C1. The driving power outputted to the second sun gear S2 as described above is transmitted to the output shaft 63 along a path from the second planet gears P2 to the second ring gear R2 to the second ring outer periphery gear Gr2 to the output gear 71.

In the region in which the vehicle speed is V2 or greater to less than V3, the Lo-clutch CL is disconnected, the Hi-clutch CH is connected, the first motor clutch Cm1 is disconnected, and the second motor clutch Cm2 is connected (H1 mode). Because the Hi-clutch CH is connected in the H1 mode, the second carrier C2 and the first ring gear R1 are connected. Because the Lo-clutch CL is disconnected, the second carrier C2 is released. Therefore, the rotation speeds of the first ring gear R1 and the second carrier C2 match. Moreover, the second connecting gear Ga2 is connected to the rotating shaft Sm2 of the second motor MG2 and the first connecting gear Ga1 is disconnected from the rotating shaft Sm1 of the first motor MG1. As a result, the third motor MG3 is connected to the second motor MG2 via the third motor gear Gm3, the first connecting gear Ga1, the second connecting gear Ga2, and the second motor clutch Cm2. The third motor MG3 is disconnected from the first motor MG1 because the first motor clutch Cm1 is disconnected.

The driving power from the engine 21 in the H1 mode is inputted to the first sun gear S1 and the driving power is outputted from the first carrier C1 to the second sun gear S2. The driving power inputted to the first sun gear S1 is outputted from the first carrier C1 through the first carrier gear Gc1 and the first motor gear Gm1 to the first motor MG1. The first motor MG1 functions mainly as a generator in the H1 mode, and thus a portion of the electrical power generated by the first motor MG1 is stored in the capacitor 64.

The second motor MG2 and the third motor MG3 function mainly as electric motors in the H1 mode. The driving power of the third motor MG3 is transmitted to the rotating shaft Sm2 of the second motor MG2 via the third motor gear Gm3, the first connecting gear Ga1, the second connecting gear Ga2, and the second motor clutch Cm2. The driving power of the second motor MG2 and the driving power of the third motor MG3 is outputted to the second carrier C2 along a path from the second motor gear Gm2 to the first ring outer periphery gear Gr1 to the first ring gear R1 to the Hi-clutch CH. The driving power outputted to the second sun gear S2 as described above is outputted through the second planet gears P2 to the second ring gear R2, and the driving power outputted to the second carrier C2 is outputted through the second planet gears P2 to the second ring gear R2. The driving power combined by the second ring gear R2 in this way is transmitted through the second ring outer periphery gear Gr2 and the output gear 71 to the output shaft 63.

In the region in which the vehicle speed is V3 or greater to less than V4, the Lo-clutch CL is disconnected, the Hi-clutch CH is connected, the first motor clutch Cm1 is connected, and the second motor clutch Cm2 is disconnected (H2 mode). In the H2 mode, the first connecting gear Ga1 is connected to the rotating shaft Sm1 of the first motor MG1 and the second connecting gear Ga2 is disconnected from the rotating shaft Sm2 of the second motor MG2. As a result, the third motor MG3 is connected to the first motor MG1 via the third motor gear Gm3, the first connecting gear Ga1, and the first motor clutch Cm1. The third motor MG3 is disconnected from the second motor MG2 because the second motor clutch Cm2 is disconnected.

The driving power from the engine 21 in the H2 mode is inputted to the first sun gear S1 and the driving power is outputted from the first carrier C1 to the second sun gear S2. The driving power inputted to the first sun gear S1 is outputted from the first carrier C1 through the first carrier gear Gc1 and the first motor gear Gm1 to the first motor MG1 and the third motor MG3. The first motor MG1 and the third motor MG3 function mainly as generators in the H2 mode, and thus a portion of the electrical power generated by the first motor MG1 and the third motor MG3 is stored in the capacitor 64.

The second motor MG2 functions mainly as an electric motor in the H2 mode. The driving power of the second motor MG2 is outputted to the second carrier C2 along a path from the second motor gear Gm2 to the first ring outer periphery gear Gr1 to the first ring gear R1 to the Hi-clutch CH. The driving power outputted to the second sun gear S2 as described above is outputted through the second planet gears P2 to the second ring gear R2, and the driving power outputted to the second carrier C2 is outputted through the second planet gears P2 to the second ring gear R2. The driving power combined by the second ring gear R2 in this way is transmitted through the second ring outer periphery gear Gr2 and the output gear 71 to the output shaft 63.

While forward movement driving has been discussed above, the operations of reverse movement driving are the same.

Figure 5:
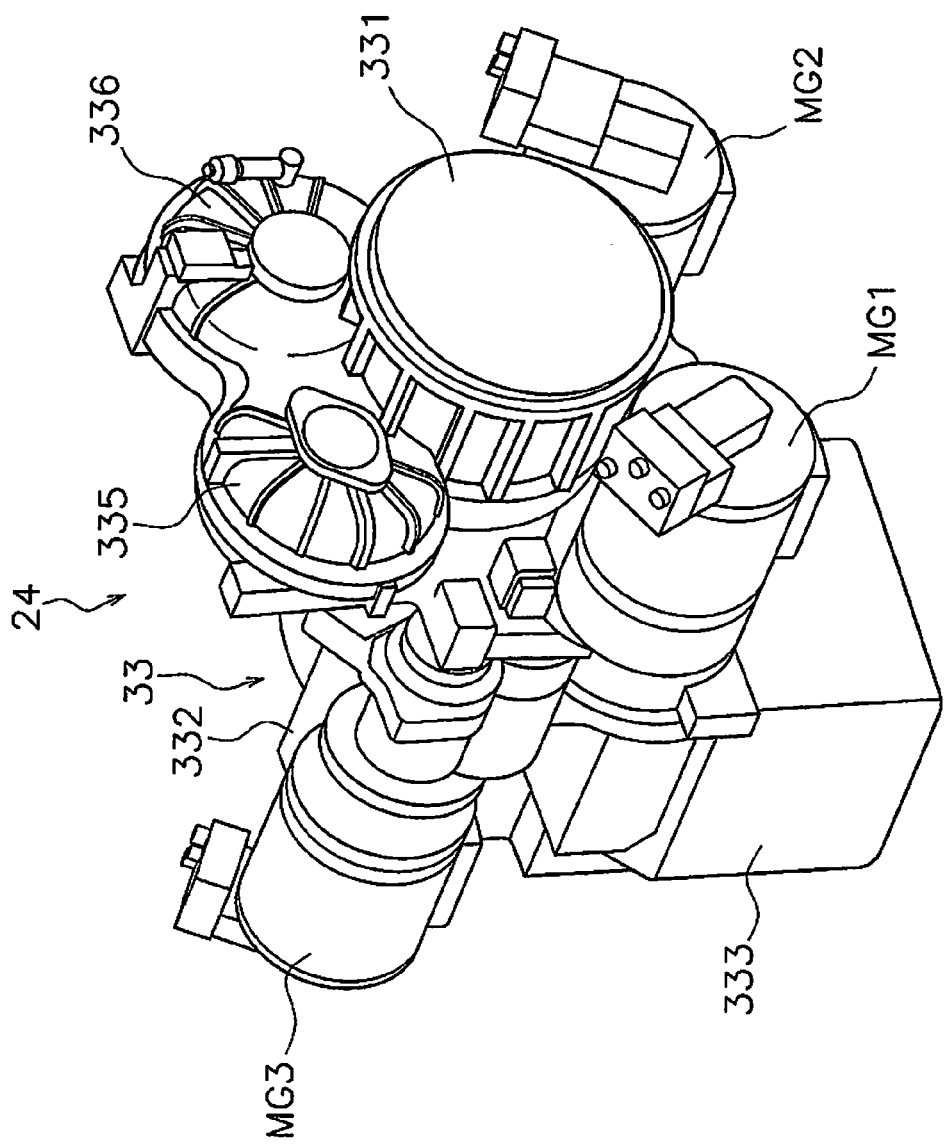
FIG. 5 is a perspective view of a transmission.
Figure 6:
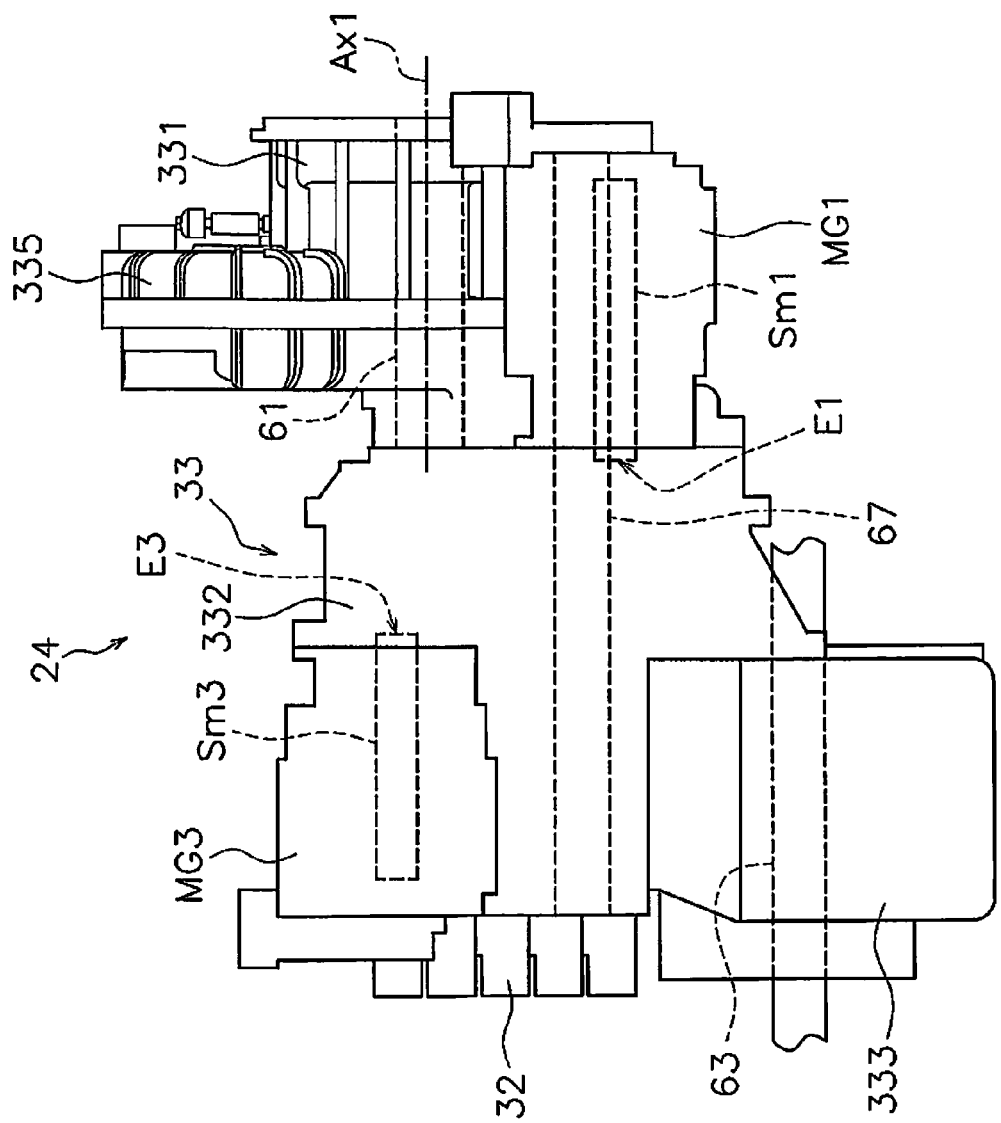
FIG. 6 is a left side surface view of the transmission.
Figure 7:
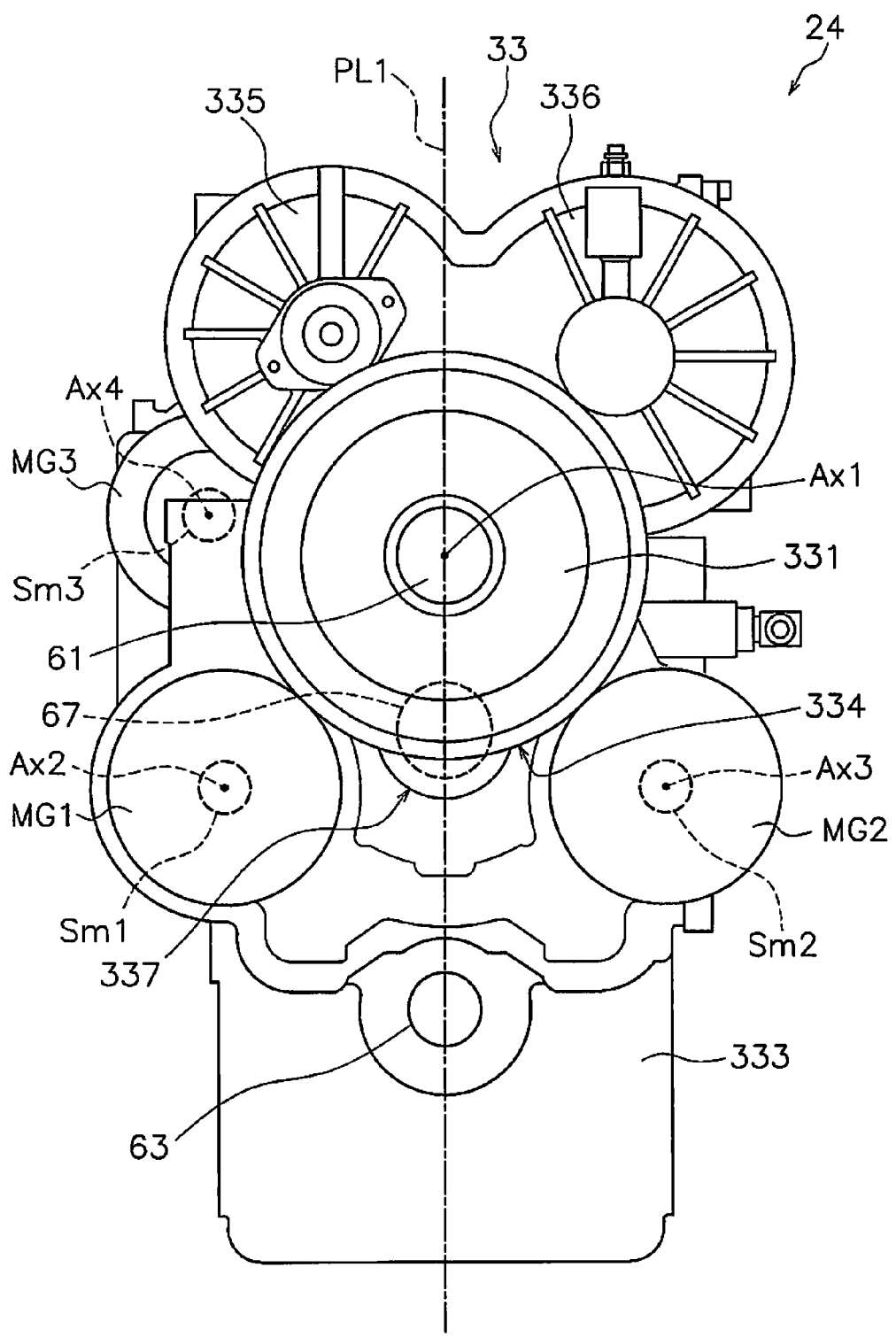
FIG. 7 is a rear surface view of the transmission.

Next, a configuration of the transmission 24 will be discussed. FIG. 5 is a perspective view of a transmission 24. FIG. 6 is a left surface side view of the transmission 24. FIG. 7 is a rear surface view of the transmission 24.

The transmission 24 has a transmission case 33. The transmission case 33 houses the input shaft 61, the gear mechanism 62, and the output shaft 63. Specifically, the transmission case 33 has an input shaft case 331, a middle shaft case 332, and an output shaft case 333. The input shaft case 331 houses the input shaft 61. The input shaft 61 extends in the front-back direction of the vehicle. As illustrated in FIG. 7, a lower part of the input shaft case 331 includes a curved surface part 334. The curved surface part 334 is curved to protrude downwards. Specifically, the input shaft case 331 has a shape that is approximately cylindrical. The center axis of the input shaft case 331 extends in the vehicle front-back direction. The center axis of the input shaft case 331 matches a center axis Ax1 of the input shaft 61.

The transmission case 33 has a first PTO case 335 and a second PTO case 336. The first PTO case 335 houses the first PTO 22 (see FIG. 2). The second PTO case 336 houses the second PTO 27 (see FIG. 2). The first PTO case 335 and the second PTO case 336 are positioned over the input shaft case 331. The first PTO case 335 and the second PTO case 336 are connected to the input shaft case 331. The first PTO case 335 and the second PTO case 336 are arranged in a row in the vehicle width direction.

The middle shaft case 332 houses the above-mentioned first planetary gear mechanism 68 and the second planetary gear mechanism 69. Furthermore, the middle shaft case 332 houses the middle shaft 67. The middle shaft 67 extends in the vehicle front-back direction and is positioned under the input shaft 61. The middle shaft case 332 is arranged in line with the input shaft case 331 in the vehicle front-back direction. Specifically, the middle shaft case 332 is positioned in front of the input shaft case 331. The middle shaft case 332 is positioned forward the first PTO case 335 and the second PTO case 336. A bottom part of the middle shaft case 332 is positioned below a bottom part of the input shaft case 331. The above-mentioned clutch control valve 32 is attached to the front surface of the middle shaft case 332.

As illustrated in FIG. 7, the transmission case 33 further has a protruding part 337 that protrudes downward from the bottom part of the input shaft case 331. The protruding part 337 extends in the vehicle front-back direction and is connected to the middle shaft case 332. A portion of the middle shaft 67 positioned further to the rear of the middle shaft case 332 is arranged inside the protruding part 337.

The output shaft case 333 houses the output shaft 63. The output shaft case 333 is positioned under the middle shaft case 332. The output shaft case 333 is positioned forward the input shaft case 331. A bottom part of the output shaft case 333 is positioned the furthest below the transmission case 33. The output shaft 63 protrudes from the output shaft case 333. The output shaft 63 extends in the vehicle front-back direction and is coupled to the transmission shaft 46.

The first motor MG1, the second motor MG2, and the third motor MG3 are attached to the transmission case 33. Specifically, the first motor MG1, the second motor MG2, and the third motor MG3 are attached to the middle shaft case 332.

The first motor MG1 and the second motor MG2 are arranged below the input shaft 61. The first motor MG1 and the second motor MG2 overlap the traveling wheels 5 as seen from the side of the vehicle (see FIG. 1). Portions of the first motor MG1 and the second motor MG2 overlap the curved surface part 334 as seen in a projection view in the up-down direction. That is, the first motor MG1 and the second motor MG2 overlap the input shaft case 331 as seen in a projection view in the up-down direction (see FIG. 15). Portions of the first motor MG1 and the second motor MG2 overlap the middle shaft case 332 as seen in the vehicle front-back direction. The first PTO case 335 and the second PTO case 336 are arranged over the first motor MG1 and the second motor MG2. The output shaft case 333 is positioned forward the first motor MG1 and the second motor MG2 and protrudes to a position below the first motor MG1.

As illustrated in FIG. 7, the first motor MG1 and the second motor MG2 are arranged symmetrically relative to a vertical plane PL1 that passes through the center axis Ax1 of the input shaft 61. The input shaft 61, the middle shaft 67, and the output shaft 63 are arranged in a row in the up-down direction as seen in the shaft direction of the input shaft 61.

A rotational axis Ax2 of the first motor MG1 is positioned below the bottom part of the input shaft case 331. A rotational axis Ax3 of the second motor MG2 is positioned below the bottom part of the input shaft case 331. The bottom part of the first motor MG1 is positioned below the bottom part of the input shaft case 331. The bottom part of the second motor MG2 is positioned below the bottom part of the input shaft case 331. The uppermost part of the first motor MG1 is positioned above the bottom part of the input shaft case 331. The uppermost part of the second motor MG2 is positioned above the bottom part of the input shaft case 331. The first motor MG1 and the second motor MG2 are arranged with an interval therebetween in the vehicle width direction. The protruding part 337 is arranged between the first motor MG1 and the second motor MG2 in the vehicle width direction. That is, the middle shaft 67 is arranged between the first motor MG1 and the second motor MG2 in the vehicle width direction. The first motor MG1 and the second motor MG2 are arranged obliquely upward the output shaft 63.

The third motor MG3 is arranged beside of the transmission case 33. The third motor MG3 is arranged on the same side as the first motor MG1 with respect to the vertical plane PL1 that passes through the center of the transmission case 33. In the present embodiment, the first motor MG1 and the third motor MG3 are arranged to the left of the vertical plane PL1. The second motor MG2 is arranged to the right of the vertical plane PL1 that passes through the center of the transmission case 33. The third motor MG3 is arranged by being shifted in the vehicle front-back direction with respect to the first motor MG1 and the second motor MG2. Specifically, the third motor MG3 is positioned forward the first motor MG1 and the second motor MG2. The third motor MG3 is arranged to the side of the middle shaft case 332. The third motor MG3 is positioned above the output shaft case 333.

A rotational axis Ax4 of the third motor MG3 is positioned above the rotational axis Ax2 of the first motor MG1 and the rotational axis Ax3 of the second motor MG2. As illustrated in FIG. 6, an end E1 of the rotating shaft Sm1 of the first motor MG1 and an end of the rotating shaft Sm2 of the second motor MG2 are oriented in a direction from the first motor MG1 and the second motor MG2 toward the third motor MG3 in the vehicle front-back direction. An end E3 of the rotating shaft Sm3 of the third motor MG3 is oriented in a direction from the third motor MG3 toward the first motor MG1 and the second motor MG2 in the vehicle front-back direction. Specifically, the end E1 of the rotating shaft Sm1 of the first motor MG1 and the end of the rotating shaft Sm2 of the second motor MG2 face toward the front. The end E3 of the rotating shaft Sm3 of the third motor MG3 faces toward the rear.

Figure 8:
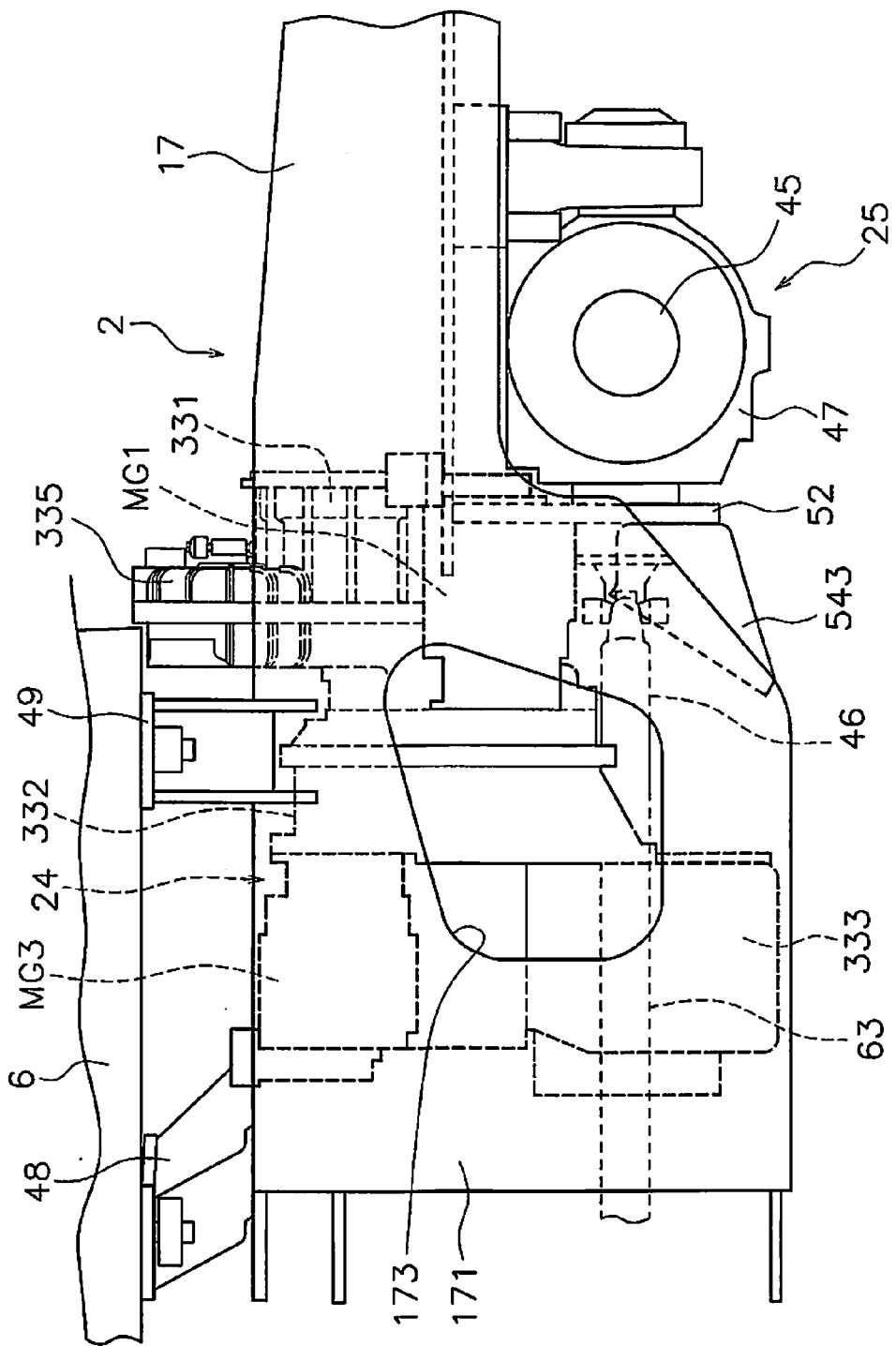
FIG. 8 is a side surface view of a portion of the rear part of the wheel loader.

FIG. 8 is a side surface view of a portion of the rear part of the wheel loader 1. A portion of the configuration, such as the traveling wheels 5 and an exterior cover, are omitted in FIG. 8 to facilitate understanding. As illustrated in FIG. 8, the travel device 25 has an axle housing 47. The axle housing 47 houses the axle shaft 45. The axle housing 47 is supported in a swingable manner on the vehicle body frame 2. Specifically, the axle housing 47 is supported in a swingable manner on the rear frame 17. The axle housing 47 is swingable around the transmission shaft 46 and consequently end parts on the left and right of the axle shaft 45 move in the up-down direction.

The first motor MG1 and the second motor MG2 are arranged by being shifted in the vehicle front-back direction with respect to the axle housing 47. Specifically, the axle housing 47 is positioned further toward the rear than the first motor MG1 and the second motor MG2. The bottom part of the first motor MG1 is arranged below the uppermost part of the axle housing 47. The bottom part of the second motor MG2 is arranged below the uppermost part of the axle housing 47.

The transmission shaft 46 is arranged under the transmission 24 and extends in the vehicle front-back direction. The transmission shaft 46 is arranged behind the output shaft case 333. The transmission shaft 46 is arranged under the middle shaft case 332. The transmission shaft 46 is arranged on the same axis as the output shaft 63. Therefore, the first motor MG1 and the second motor MG2 are arranged obliquely upward the transmission shaft 46 as seen in the axial direction of the transmission shaft 46.

Figure 9:
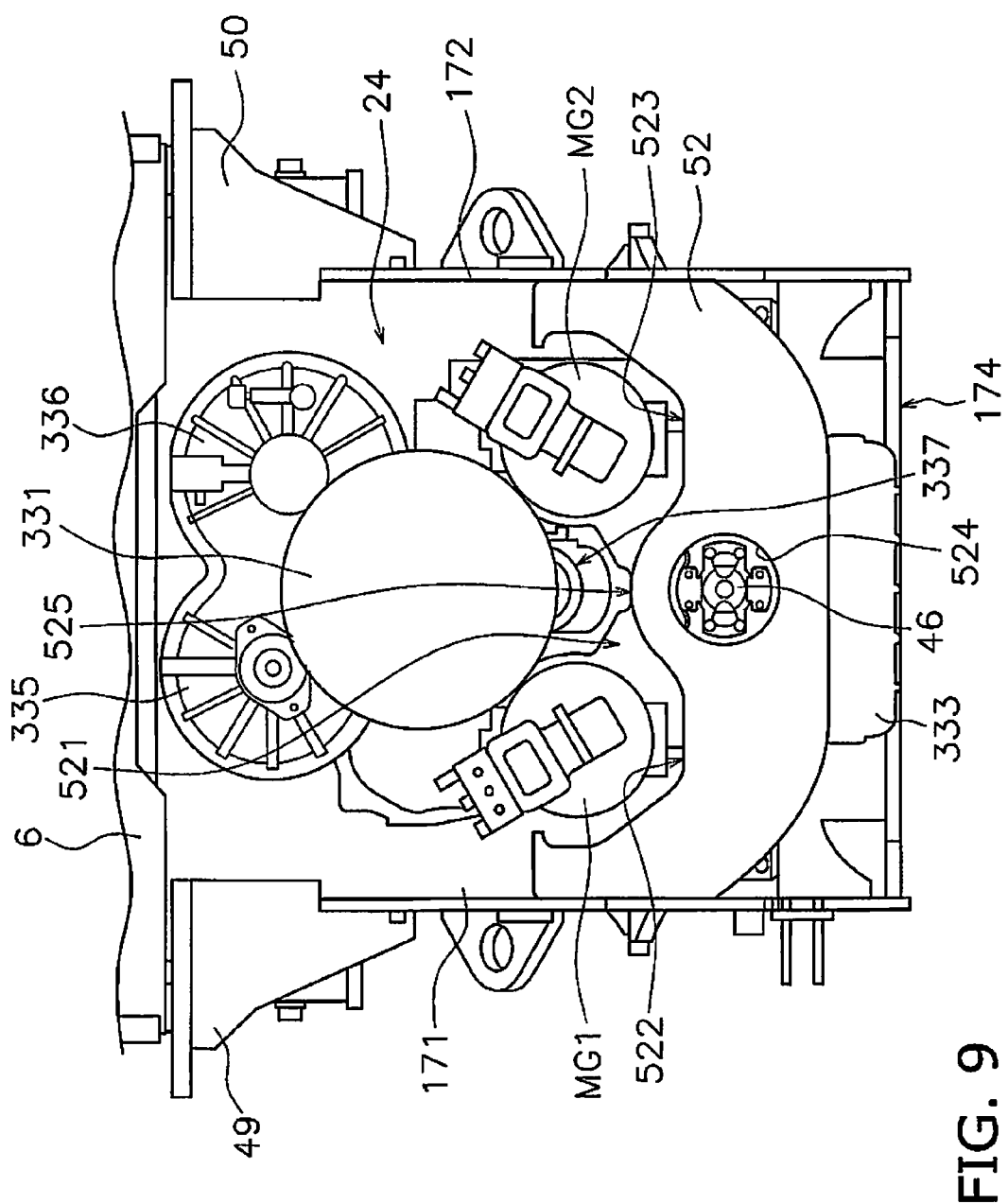
FIG. 9 is a rear surface view of a portion of the rear part of the wheel loader.

FIG. 9 is a rear surface view of a portion of the rear part of the wheel loader 1. A portion of the configuration such as the traveling wheels 5 and the axle housing 47 are omitted in FIG. 9 to facilitate understanding. As illustrated in FIG. 9, the rear frame 17 has a left side part 171 and a right side part 172. The transmission 24 is arranged between the left side part 171 and the right side part 172 and is supported by the vehicle body frame 2. The first motor MG1 and the second motor MG2 are arranged between the left side part 171 and the right side part 172.

The rear frame 17 has a plurality of mount parts 48 to 51 (see FIG. 15) for supporting the operating cabin 6. The operating cabin 6 is attached in a detachable manner to the mount parts 48 to 51. Therefore, the operating cabin 6 is attached in a detachable manner to the vehicle body frame 2. Specifically, the plurality of mount parts 48 to 51 include a pair of front mount parts 48 and 51 and a pair of rear mount parts 49 and 50. The third motor MG3 is positioned under the operating cabin 6.

As illustrated in FIG. 8, a side part opening 173 is provided in the left side part 171. The side part opening 173 is positioned to the side of the transmission 24. A portion of the first motor MG1 opposes the side part opening 173. An exterior cover (not illustrated) is attached in a detachable manner to the left side part 171. The side part opening 173 is covered by the exterior cover while the exterior cover is attached. A portion of the first motor MG1 is visible through the side part opening 173 while the exterior cover is removed. An opening similar to the side part opening 173 of the left side part 171 is provided in the right side part 172.

Figure 10:
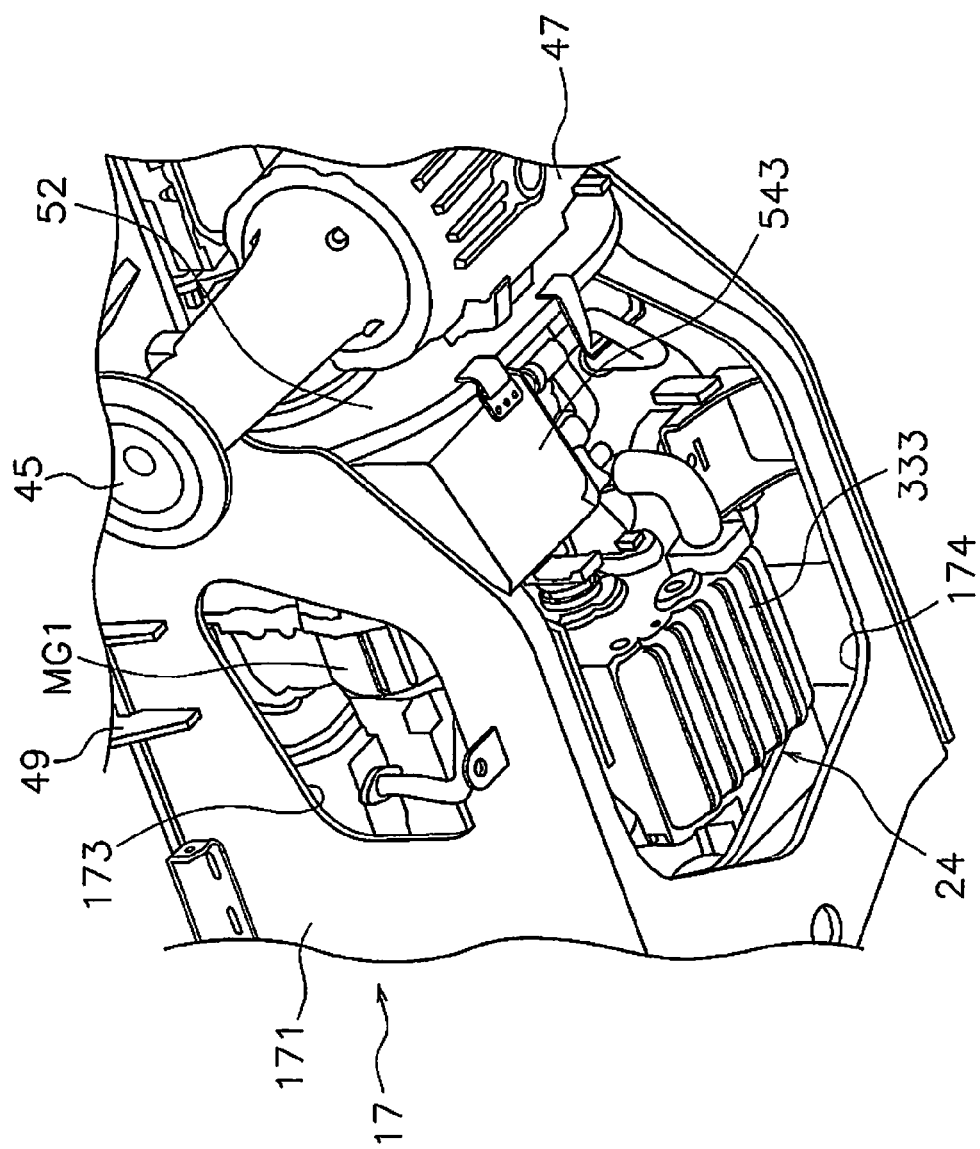
FIG. 10 is a view seen obliquely from below of a portion of the rear part of the wheel loader.

FIG. 10 is a view seen obliquely from below of a portion of the rear part of the wheel loader 1. As illustrated in FIG. 10, a bottom part opening 174 is provided in the bottom surface of the rear frame 17. The bottom part opening 174 is positioned under the transmission 24. As illustrated in FIG. 9, the bottom part opening 174 is positioned under the output shaft case 333 and the transmission shaft 46. Therefore, the bottom part opening 174 is positioned under the first motor MG1 and the second motor MG2. A bottom plate (not illustrated) is attached to the bottom surface of the rear frame 17 in a detachable manner to cover the bottom part opening 174.

As illustrated in FIG. 8, the vehicle body frame 2 further has a mount bracket 52 that supports the axle housing 47 in a swingable manner. The mount bracket 52 is positioned in front of the axle housing 47. The mount bracket 52 is a plate-like member which extends in the vehicle width direction and the up-down direction.

As illustrated in FIG. 9, an upper surface of the mount bracket 52 has a recessed part 521. The recessed part 521 has a shape that is recessed downward from the upper surface of the mount bracket 52. The first motor MG1 and the second motor MG2 are arranged to pass through the recessed part 521 in the vehicle front-back direction. Specifically, the recessed part 521 has a first recessed part 522 and a second recessed part 523. The first recessed part 522 and the second recessed part 523 are aligned in the vehicle width direction and are joined to each other. The first motor MG1 is arranged so as to pass through the first recessed part 522 in the vehicle front-back direction. The second motor MG2 is arranged to pass through the second recessed part 523 in the vehicle front-back direction. The protruding part 337 of the transmission case 33 is arranged between the first recessed part 522 and the second recessed part 523.

The mount bracket 52 has a through-hole 524. The through-hole 524 passes through the mount bracket 52 in the vehicle front-back direction. The through-hole 524 is located under the recessed part 521. Specifically, the recessed part 521 has a ridge part 525 positioned between the first recessed part 522 and the second recessed part 523. The ridge part 525 has a shape that rises to a position above the bottom part of the first recessed part 522 and the bottom part of the second recessed part 523. The through-hole 524 is positioned under the ridge part 525. The transmission shaft 46 passes through the through-hole 524.

Figure 11A:
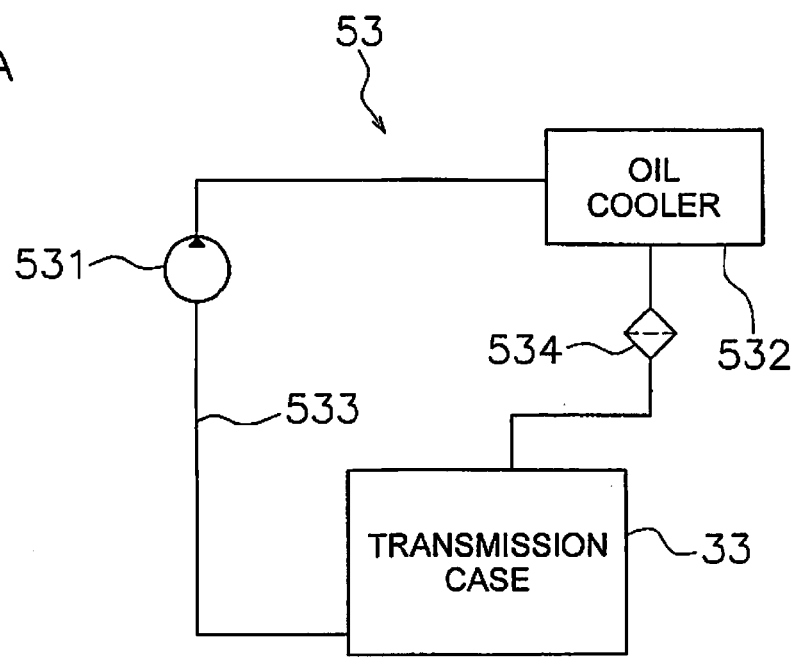
FIGS. 11A and 11B are schematic views illustrating configurations of a transmission lubrication system and a motor cooling system.
Figure 11B:
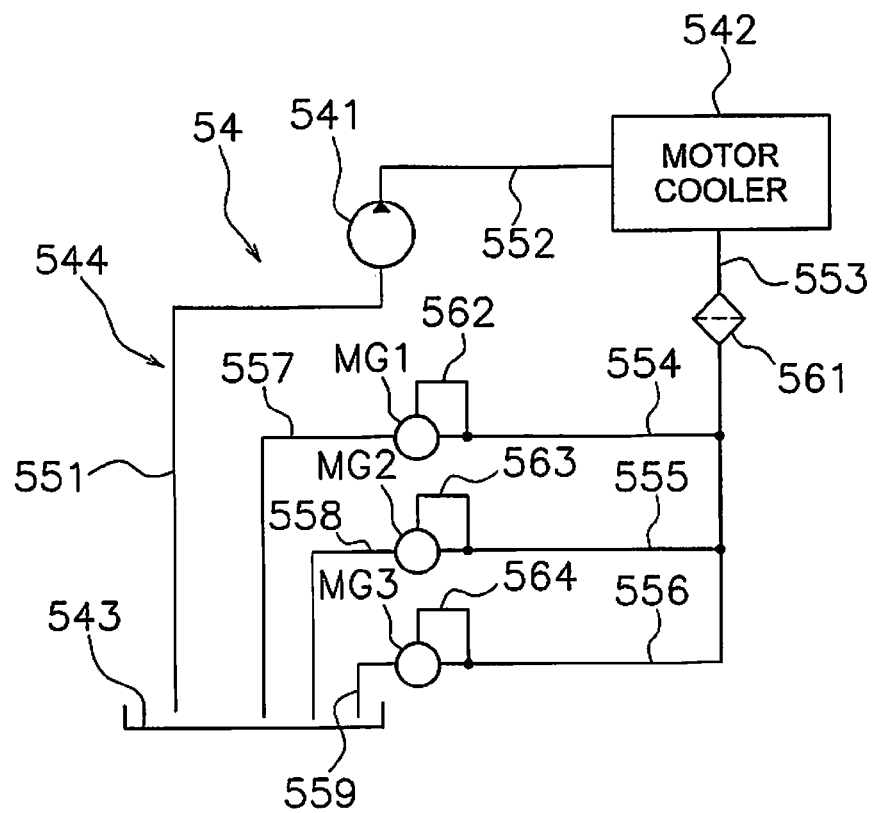

Next, a transmission lubrication system 53 and a motor cooling system 54 included in the transmission 24 will be discussed. FIG. 11A is a schematic view illustrating a configuration of the transmission lubrication system 53. FIG. 11B is a schematic view of a configuration of the motor cooling system 54. The transmission lubrication system 53 circulates lubricating oil for lubricating the transmission 24.

As illustrated in FIG. 11A, the transmission lubrication system 53 has a lubricating oil pump 531, an oil cooler 532, and a lubricating oil pipe 533. The lubricating oil pump 531 and the oil cooler 532 are connected to the transmission case 33 via the lubricating oil pipe 533. A lubricating oil filter 534 is provided between the oil cooler 532 and the transmission case 33 in the lubricating oil pipe 533.

The lubricating oil inside the transmission case 33 is stored inside the output shaft case 333. The lubricating oil pump 531 feeds the lubricating oil inside the output shaft case 333 to the oil cooler 532. The lubricating oil is cooled in the oil cooler 532 and supplied to the transmission case 33. The lubricating oil lubricates various gears inside the transmission case 33. The lubricating oil drips off the various gears and is stored in the output shaft case 333.

Figure 12:
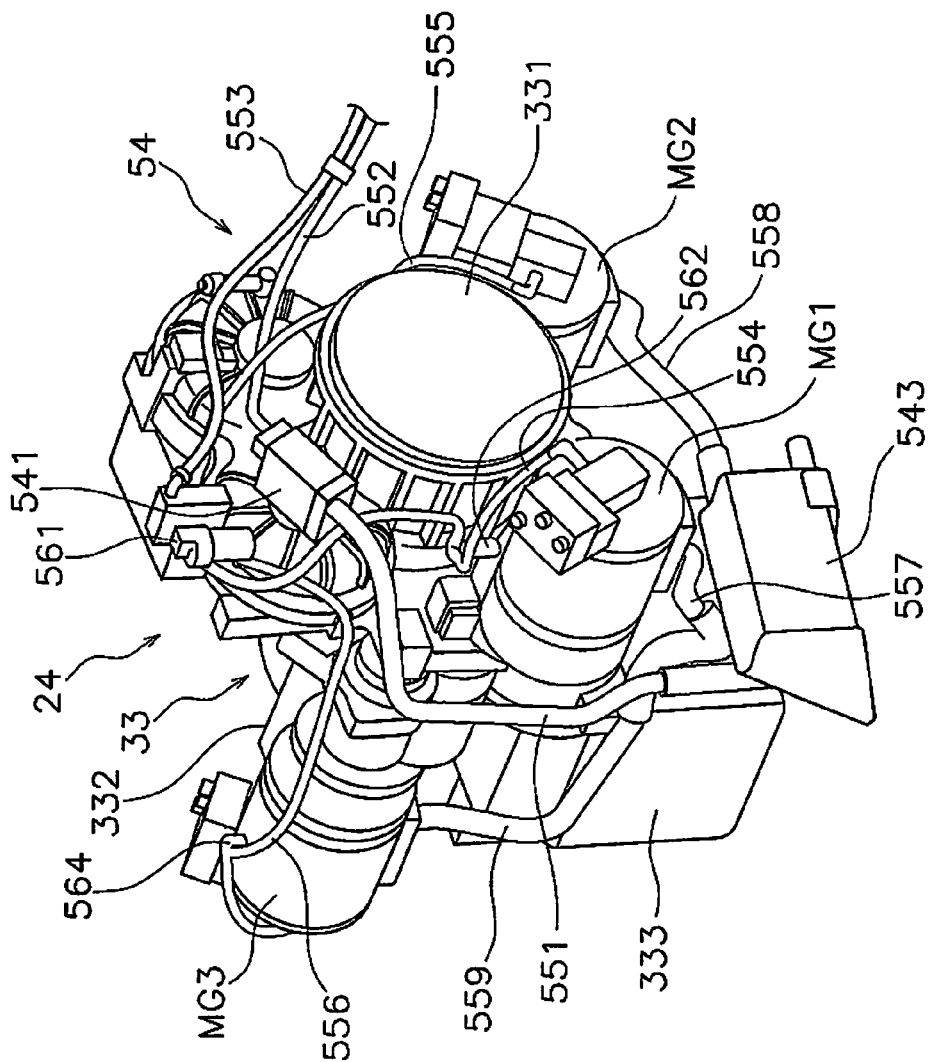
FIG. 12 is a perspective view of the transmission including the motor cooling system.

The motor cooling system 54 is separate from the transmission lubrication system 53 and circulates cooling oil for cooling the first to third motors MG1 to MG3. FIG. 12 is a perspective view of the transmission 24 including the motor cooling system 54. As illustrated in FIG. 11B and FIG. 12, the motor cooling system 54 has a cooling oil pump 541, a motor cooler 542, a cooling oil tank 543, and a cooling oil pipe 544. The cooling oil pump 541, the motor cooler 542, and the cooling oil tank 543 are connected to the first to third motors MG1 to MG3 via the cooling oil pipe 544. Specifically, the cooling oil pipe 544 includes a first cooling oil pipe 551, a second cooling oil pipe 552, a third cooling oil pipe 553, a first supply pipe 554, a second supply pipe 555, a third supply pipe 556, a first drain pipe 557, a second drain pipe 558, and a third drain pipe 559. The first cooling oil pipe 551 connects the cooling oil tank 543 and the cooling oil pump 541. The second cooling oil pipe 552 connects the cooling oil pump 541 and the motor cooler 542. The third cooling oil pipe 553 is connected to the motor cooler 542. The motor cooler 542 cools the cooling oil. The motor cooler 542 is included in the above-mentioned cooling device 26 with the oil cooler 532. The third cooling oil pipe 553 is connected to the first supply pipe 554, the second supply pipe 555, and the third supply pipe 556. A cooling oil filter 561 is provided in the third cooling oil pipe 553.

The first supply pipe 554 is connected to the first motor MG1. A first branch pipe 562 is connected to the first supply pipe 554. Specifically, the first supply pipe 554 is connected to a cooling oil path inside the rotating shaft Sm1 of the first motor MG1. The first branch pipe 562 is connected to an upper part of the motor case of the first motor MG1. A configuration of the first motor MG1 is discussed below.

The second supply pipe 555 is connected to the second motor MG2. A second branch pipe 563 is connected to the second supply pipe 555. Specifically, the second supply pipe 555 is connected to a cooling oil path inside the rotating shaft Sm2 of the second motor MG2. The second branch pipe 563 is connected to an upper part of the motor case of the second motor MG2.

The third supply pipe 556 is connected to the third motor MG3. A third branch pipe 564 is connected to the third supply pipe 556. Specifically, the third supply pipe 556 is connected to a cooling oil path inside the rotating shaft Sm3 of the third motor MG3. The third branch pipe 564 is connected to an upper part of the motor case of the third motor MG3.

The first drain pipe 557 connects the first motor MG1 and the cooling oil tank 543. The second drain pipe 558 connects the second motor MG2 and the cooling oil tank 543. The third drain pipe 559 connects the third motor MG3 and the cooling oil tank 543.

The cooling oil tank 543 stores the cooling oil for cooling the first motor MG1, the second motor MG2, and the third motor MG3. The cooling oil pump 541 sucks in the cooling oil inside the cooling oil tank 543 via the first cooling oil pipe 551 and feeds the cooling oil to the motor cooler 542 via the second cooling oil pipe 552. The cooling oil is cooled by the motor cooler 542. The cooling oil is branched from the third cooling oil pipe 553 to the first supply pipe 554, the second supply pipe 555, and the third supply pipe 556.

The cooling oil is supplied from the first supply pipe 554 and the first branch pipe 562 to the first motor MG1 to cool the first motor MG1. The cooling oil is returned from the first motor MG1 to the cooling oil tank 543 via the first drain pipe 557. The cooling oil is supplied from the second supply pipe 555 and the second branch pipe 563 to the second motor MG2 to cool the second motor MG2. The cooling oil is returned from the second motor MG2 to the cooling oil tank 543 via the second drain pipe 558. The cooling oil is supplied from the third supply pipe 556 and the third branch pipe 564 to the third motor MG3 to cool the third motor MG3. The cooling oil is returned from the third motor MG3 to the cooling oil tank 543 via the third drain pipe 559.

Figure 13:
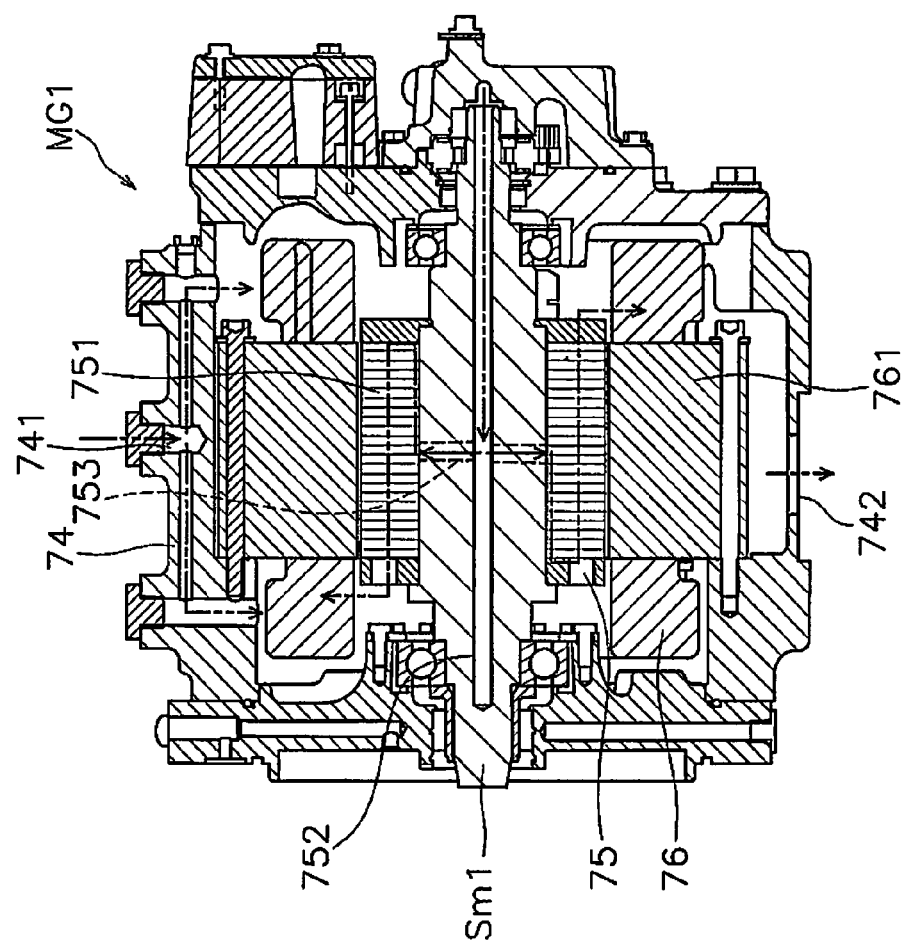
FIG. 13 is a cross-sectional view of the first motor.

FIG. 13 is a cross-sectional view of the first motor MG1. As illustrated in FIG. 13, the first motor MG1 has a motor case 74, the rotating shaft Sm1, a rotor 75, and a stator 76. The motor case 74 houses the rotating shaft Sm1, the rotor 75, and the stator 76. The rotor 75 is fixed to the rotating shaft Sm1 and is provided to rotate with the rotating shaft Sm1. The rotor 75 has a magnet 751. The magnet 751 is configured, for example, by stacking a plurality of thin plate-like electromagnetic steel sheets. The stator 76 is arranged to encircle the periphery of the rotor 75. The stator 76 has a coil 761.

The rotating shaft Sm1 has the liquid coolant path 752. The liquid coolant path 752 is provided along the center axis of the rotating shaft Sm1. The liquid coolant path 752 communicates with a through-hole 753. The through-hole 753 passes through the rotating shaft Sm1 in the axial direction. The cooling oil from the first supply pipe 554 is supplied to the liquid coolant path 752 and is supplied to the rotor 75 via the through-hole 753. The cooling oil supplied to the rotor 75 is scattered inside the motor case 74 by centrifugal force caused by the rotation of the rotor 75.

A cooling oil supply port 741 is provided in the uppermost part of the motor case 74. The cooling oil supply port 741 communicates with a space inside the motor case 74. The above-mentioned first branch pipe 562 is connected to the cooling oil supply port 741. The cooling oil from the first branch pipe 562 drips down due to gravity via the cooling oil supply port 741 whereby the cooling oil is supplied to the motor case 74.

A cooling oil drain port 742 is provided in the bottom part of the motor case 74. The cooling oil drain port 742 communicates with a space inside the motor case 74. The abovementioned first drain pipe 557 is connected to the cooling oil drain port 742. The cooling oil supplied to the inside of the motor case 74 is returned due to gravity from the cooling oil drain port 742 to the cooling oil tank 543 via the first drain pipe 557.

Explanations of the configurations of the second motor MG2 and the third motor MG3 will be omitted because the configurations thereof are similar to the configuration of the above-mentioned first motor MG1.

As illustrated in FIG. 8, the cooling oil tank 543 is positioned below the first motor MG1 and the second motor MG2. The cooling oil tank 543 is positioned below the third motor MG3. The cooling oil tank 543 is positioned behind the output shaft case 333 and under the first motor MG1. The cooling oil tank 543 is positioned in front of the axle housing 47. The cooling oil tank 543 overlaps the traveling wheels 5 as seen in a side view of the vehicle (see FIG. 1).

Figure 14:
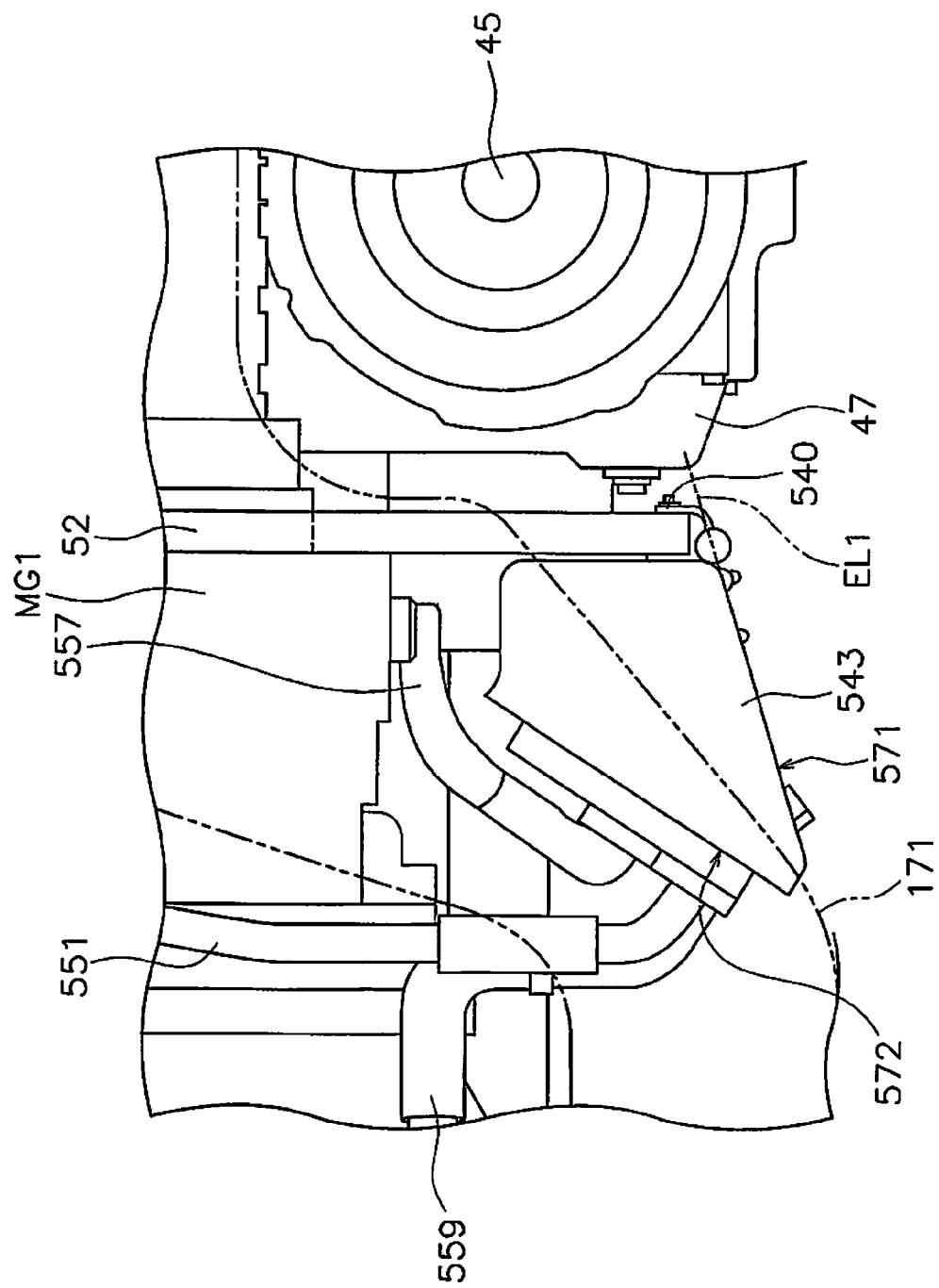
FIG. 14 is an enlarged view of a configuration of the cooling oil tank in FIG. 8 and the vicinity thereof.

FIG. 14 is an enlarged view of a configuration of the cooling oil tank 543 in FIG. 8 and the vicinity thereof. As illustrated in FIG. 14, the cooling oil tank 543 is attached to the mount bracket 52 via a bracket 540. The bottom surface of the cooling oil tank 543 has a first sloped surface 571 that slopes to the rear and upward. A virtual extension line ELI of the first sloped surface 571 as seen in a side view of the vehicle overlaps the axle housing 47.

The front surface of the cooling oil tank 543 has a second sloped surface 572 that slopes to the front and downward. The cooling oil pipe 544 is connected to the second sloped surface 572. Specifically, the first cooling oil pipe 551, the first drain pipe 557, the second drain pipe 558, and the third drain pipe 559 are connected to the second sloped surface 572. The first drain pipe 557 is arranged to not have a portion that extends upward from the first motor MG1 toward the cooling oil tank 543. The second drain pipe 558 is arranged to not have a portion that extends upward from the second motor MG2 toward the cooling oil tank 543. The third drain pipe 559 is arranged to not have a portion that extends upward from the third motor MG3 toward the cooling oil tank 543.

Figure 15:
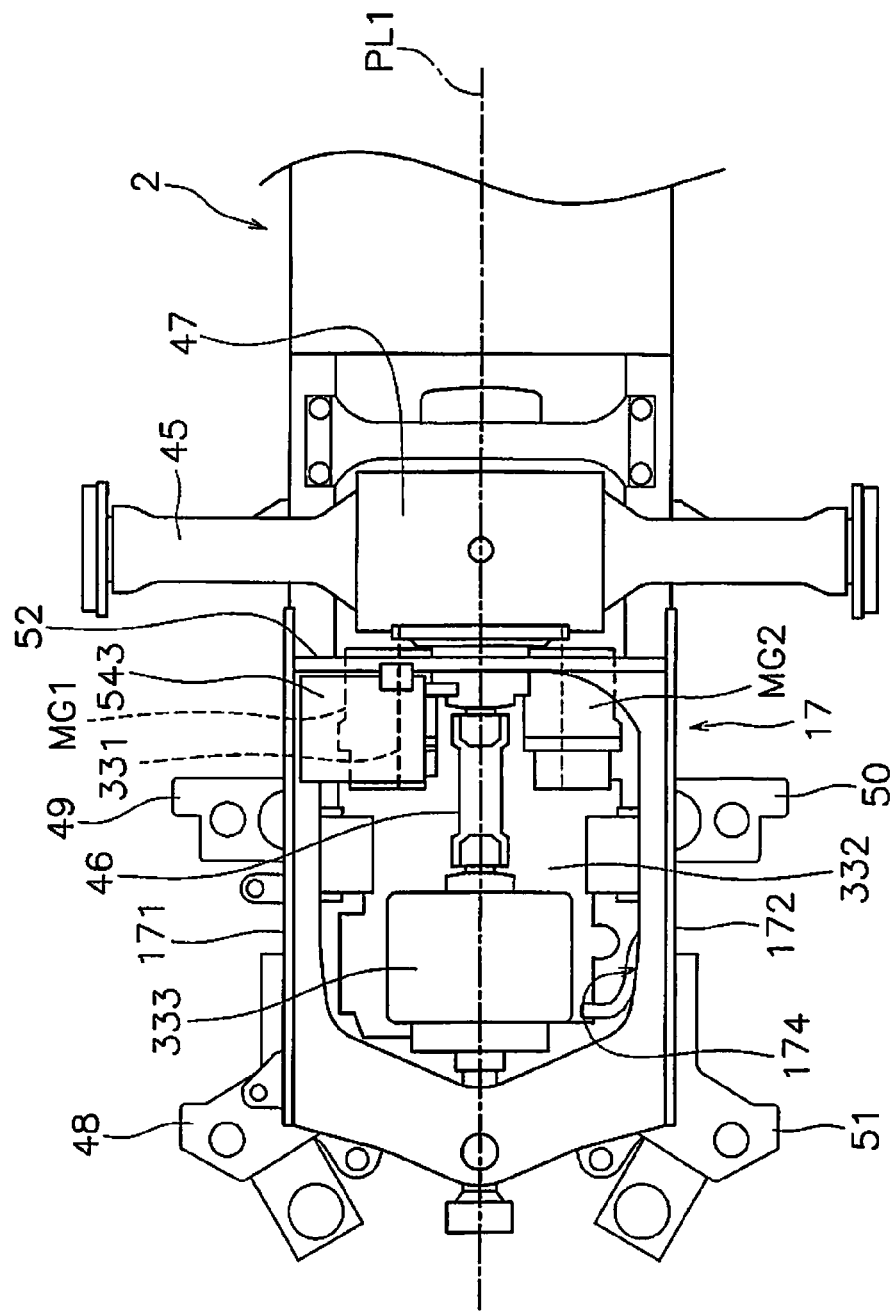
FIG. 15 is a bottom surface view of a portion of the rear part of the wheel loader.

FIG. 15 is a bottom surface view of a portion of the rear part of the wheel loader 1. As illustrated in FIG. 15, the cooling oil tank 543 is arranged between the side surface of the vehicle body frame 2 and the transmission shaft 46 in the vehicle width direction. In the present exemplary embodiment, the cooling oil tank 543 is arranged between the left side part 171 of the vehicle body frame 2 and the transmission shaft 46 in the vehicle width direction.

The first motor MG1, the third motor MG3, and the cooling oil tank 543 are arranged on the same side with regard to the center axis of the transmission 24 that extends in the vehicle front-back direction. That is, the first motor MG1, the third motor MG3, and the cooling oil tank 543 are arranged on the same side with regard to the vertical plane PL1 that includes the center axis Ax1 of the input shaft 61. In the present exemplary embodiment, the first motor MG1, the third motor MG3 and the cooling oil tank 543 are arranged to the left of the vertical plane PL1. A portion of the cooling oil tank 543 overlaps the first motor MG1 as seen from the bottom surface.

The wheel loader 1 according to the present exemplary embodiment has the following characteristics.

The cooling oil tank 543 is positioned behind the output shaft case 333 and under the first motor MG1. That is, by arranging the cooling oil tank 543 by using the space behind the output shaft case 333 and under the first motor MG1, the transmission case 33 and the cooling oil tank 543 can be arranged in a compact manner.

Moreover, by arranging the cooling oil tank 543 below the first to third motors MG1 to MG3, the cooling oil can be recovered from the first to third motors MG1 to MG3 to the cooling oil tank 543 due to gravity. As a result, the cooling oil can be circulated efficiently.

Moreover, the motor cooling system 54 is separate from the transmission lubrication system 53 and therefore the first to third motors MG1 to MG3 can be cooled while suppressing a deterioration in the performance of the transmission 24 or the first to third motors MG1 to MG3 in comparison to when the motor cooling system 54 is the same system as the transmission lubrication system 53.

The axle housing 47 is positioned further toward the rear than the first motor MG1. The cooling oil tank 543 is positioned in front of the axle housing 47. As a result, by arranging the cooling oil tank 543 by using the space positioned behind the output shaft case 333, under the first motor MG1, and in front of the axle housing 47, the transmission case 33, the cooling oil tank 543, and the axle housing 47 can be arranged in a compact manner.

The bottom surface of the cooling oil tank 543 has the first sloped surface 571 that slopes to the rear and upward. As a result, air flowing under the wheel loader 1 can be guided toward the axle housing 47 due to the bottom surface of the cooling oil tank 543. As a result, the axle housing 47 can be cooled.

The virtual extension line EL1 of the sloped surface as seen in a side view of the vehicle overlaps the axle housing 47. As a result, the axle housing 47 can be cooled more effectively due to the air flowing under the wheel loader 1.

The cooling oil tank 543 is arranged between the side surface of the rear frame 17 and the transmission shaft 46 in the vehicle width direction. In this case, the cooling oil tank 543 can be accessed easily from the side of the wheel loader 1. As a result, maintenance performance of the cooling oil tank 543 can be improved.

The front surface of the cooling oil tank 543 has the second sloped surface 572 that slopes to the front and downward. Moreover, the first cooling oil pipe 551, the first drain pipe 557, the second drain pipe 558, and the third drain pipe 559 are connected to the second sloped surface 572. As a result, the first cooling oil pipe 551, the first drain pipe 557, and the second drain pipe 558 that extend from above the cooling oil tank 543 can be connected to the second sloped surface 572 without being bent in a large manner. Consequently, the connections of the first cooling oil pipe 551, the first drain pipe 557, and the second drain pipe 558 to the second sloped surface 572 are facilitated.

The first motor MG1, the third motor MG3, and the cooling oil tank 543 are arranged on the same side with respect to the center axis of the transmission 24 that extends in the vehicle front-back direction. As a result, the installation of the first drain pipe 557 and the second drain pipe 558 is facilitated.

Although an exemplary embodiment of the present invention has been described so far, the present invention is not limited to the above exemplary embodiments and various modifications may be made within the scope of the invention.

The present invention may be applicable to another type of speed change device, such as a HMT, without being limited to the EMT. In this case, the first motor MG1 functions as a hydraulic motor and a hydraulic pump. The second motor MG2 functions as a hydraulic motor and a hydraulic pump. The third motor MG3 functions as a hydraulic motor and a hydraulic pump. The first motor MG1, the second motor MG2, and the third motor MG3 are variable capacitor pump/motors, and the capacities are controlled by the control unit 31.

The configuration of the transmission 24 is not limited to the configuration of the above exemplary embodiment. For example, the coupling and disposition of the elements of the two planetary gear mechanisms 68 and 69 are not limited to the coupling and disposition of the above exemplary embodiments. The number of planetary gear mechanisms is not limited to two. For example, the transmission may be provided with one planetary gear mechanism. The number of motors is not limited to three. The number of motors may be one, two, or four or more. For example, the third motor MG3 may be omitted.

All of the first motor MG1 and the second motor MG2 may overlap the input shaft case 331 as seen in a projection view in the up-down direction. All of the first motor MG1 and the second motor MG2 may overlap the middle shaft case 332 as seen in the vehicle front-back direction.

The shape of the input shaft case 331 is not limited to a cylindrical shape. So long as at least the lower part of the input shaft case 331 has the curved surface part 334 that is curved to protrude downward, the upper part of the input shaft case 331 may have a linear shape.

The locations of the first to third motors MG1 to MG3 are not limited to the positions of the above exemplary embodiment and may be changed. The shape of the transmission case 33 is not limited to the position of the above exemplary embodiment and may be changed. For example, the positions of the first to third motors MG1 to MG3 and/or the shape of the transmission case 33 may be reverse in the front-back direction to the respective positions and shape in the above exemplary embodiment. Alternatively, the positions of the first to third motors MG1 to MG3 and/or the shape of the transmission case 33 may be reverse in the left-right direction to the respective positions and shape in the above exemplary embodiment.

The clutch control valve 32 may be arranged in a location other than the front surface of the transmission 24. For example, the clutch control valve 32 may be arranged on the rear surface of the transmission 24.

The shape of the mount bracket 52 is not limited to the shape described in the above exemplary embodiment. For example, the shape of the recessed part 521 in the mount bracket 52 may be changed. Alternatively, the recessed part 521 may be omitted.

The shape of the vehicle body frame 2 is not limited to the shape in the above exemplary embodiment. For example, the bottom part opening 174 may be omitted. Alternatively, the side part opening 173 may be omitted.

The position of the cooling oil tank 543 is not limited to the position of the above exemplary embodiment. For example, the cooling oil tank 543 may be arranged under the second motor MG2. Alternatively, the cooling oil tank 543 may be arranged in a location other than under the transmission 24. The shape of the cooling oil tank 543 is not limited to the shape in the above exemplary embodiment. For example, the first sloped surface 571 may be omitted. Alternatively, the second sloped surface 572 may be omitted. Alternatively, the cooling oil tank 543 may have a rectangular solid shape, a cubic shape, or a cylindrical shape.

According to the present invention, cooling of the motor is enabled while an increase in the size of the vehicle body can be suppressed in the hybrid-type wheel loader.

What is claimed is:

1. A wheel loader comprising:
   an engine;
   a travel device driven by the engine; and
   a transmission that transmits driving power from the engine to the travel device;
   the transmission including
   an input shaft;
   an output shaft;
   a gear mechanism that includes a planetary gear mechanism and that transmits rotation of the input shaft to the output shaft;
   a transmission case that houses the input shaft, the gear mechanism, and the output shaft;
   a motor connected to a rotating element of the planetary gear mechanism and attached to the transmission case; and
   a motor cooling system for circulating cooling oil for cooling the motor;
   the transmission being configured so that a rotation speed ratio of the output shaft with respect to the input shaft is changed by changing a rotation speed of the motor,
   the transmission case having an output shaft case for housing the output shaft,
   the output shaft case being positioned forward of the motor in a vehicle fore-aft longitudinal direction of the wheel loader, and protruding to a position below the motor in a vehicle vertical direction of the wheel loader,
   the motor cooling system having a cooling oil tank for storing the cooling oil and a cooling oil pipe connecting the cooling oil tank and the motor, and
   the cooling oil tank being positioned behind the output shaft case in the vehicle fore-aft longitudinal direction and under the motor in the vehicle vertical direction.

2. The wheel loader according to claim 1, wherein
   the travel device further has an axle shaft that extends in a vehicle width direction of the wheel loader and an axle housing for housing the axle shaft,
   the axle housing is positioned further to the rear of the motor, and
   the cooling oil tank is positioned in front of the axle housing.

3. The wheel loader according to claim 2, wherein
   a bottom surface of the cooling oil tank has a first sloped surface that slopes diagonally rearward in the vehicle fore-aft longitudinal direction and upward in the vehicle vertical direction.

4. The wheel loader according to claim 3, wherein
   a virtual extension line of the first sloped surface overlaps the axle housing as seen in a side view of the vehicle.

5. The wheel loader according to claim 4, further comprising
   a vehicle body frame that supports the transmission,
   the travel device further including a transmission shaft that transmits driving power from the transmission to the axle shaft, and
   the cooling oil tank being arranged between a side surface of the vehicle body frame and the transmission shaft in the vehicle width direction.

6. The wheel loader according to claim 5, wherein
   a front surface of the cooling oil tank has a second sloped surface that slopes diagonally frontward in the vehicle fore-aft longitudinal direction and downward in the vehicle vertical direction, and
   the cooling oil pipe is connected to the second sloped surface.

7. The wheel loader according to claim 6, wherein
   the motor and the cooling oil tank are arranged on the same side with regard to a center axis of the transmission that extends in the vehicle fore-aft longitudinal direction.

8. The wheel loader according to claim 7, further comprising
   a transmission lubrication system for circulating lubricating oil for lubricating the transmission,
   the motor cooling system being separate from the transmission lubrication system.

9. The wheel loader according to claim 2, further comprising
   a vehicle body frame that supports the transmission,
   the travel device further including a transmission shaft that transmits driving power from the transmission to the axle shaft, and
   the cooling oil tank being arranged between a side surface of the vehicle body frame and the transmission shaft in the vehicle width direction.

10. The wheel loader according to claim 1, wherein
    a front surface of the cooling oil tank has a sloped surface that slopes diagonally frontward in the vehicle fore-aft longitudinal direction and downward in the vehicle vertical direction, and
    the cooling oil pipe is connected to the sloped surface.

11. The wheel loader according to claim 1, wherein
    the motor and the cooling oil tank are arranged on the same side with regard to a center axis of the transmission that extends in the vehicle fore-aft longitudinal direction.

12. The wheel loader according to claim 1, further comprising
    a transmission lubrication system for circulating lubricating oil for lubricating the transmission; and
    the motor cooling system being separate from the transmission lubrication system.

* * * * *